(12) United States Patent
Filji et al.

(10) Patent No.: US 12,130,930 B2
(45) Date of Patent: Oct. 29, 2024

(54) AUTOMATED MANAGEMENT OF SECURITY REQUIREMENTS AND SOFTWARE SUPPLY CHAIN DURING A SOFTWARE DEVELOPMENT LIFECYCLE

(71) Applicant: Security Compass Technologies Ltd., Toronto (CA)

(72) Inventors: Deepu Filji, Woodbridge (CA); Farbod Hosseyndoust Foomany, Toronto (CA); Ehsan Foroughi, Toronto (CA); Rohit Kumar Sethi, Toronto (CA); Geoffrey Whittington, Waterloo (CA); Trevor Young, Toronto (CA)

(*) Notice: Subject to any disclaimer, the term of this patent is extended or adjusted under 35 U.S.C. 154(b) by 237 days.

(21) Appl. No.: 17/822,350

(22) Filed: Aug. 25, 2022

(65) Prior Publication Data

US 2023/0067222 A1    Mar. 2, 2023

Related U.S. Application Data

(60) Provisional application No. 63/260,551, filed on Aug. 25, 2021.

(51) Int. Cl.
*G06F 21/57* (2013.01)
(52) U.S. Cl.
CPC ...... *G06F 21/577* (2013.01); *G06F 2221/034* (2013.01)
(58) Field of Classification Search
CPC .......... G06F 21/577; G06F 2221/034
See application file for complete search history.

(56) References Cited

U.S. PATENT DOCUMENTS

| | | | |
|---|---|---|---|
| 9,558,464 B2 | 1/2017 | Bassin et al. | |
| 10,095,478 B2 | 10/2018 | Ghaisas et al. | |
| 10,255,439 B2 | 4/2019 | Agarwal | |
| 10,469,401 B2 | 11/2019 | Mordani et al. | |
| 10,474,434 B1* | 11/2019 | Blakley | G06F 8/51 |
| 10,664,603 B2 | 5/2020 | Agarwal | |
| 10,706,156 B2 | 7/2020 | Bhalla et al. | |
| 10,855,620 B2 | 12/2020 | Mordani et al. | |
| 10,873,624 B2 | 12/2020 | Mordani et al. | |
| 11,288,061 B1* | 3/2022 | Johnson | G06F 8/51 |
| 11,379,219 B2 | 7/2022 | Bhalla et al. | |
| 11,734,418 B1* | 8/2023 | Epstein | G06F 21/53 726/22 |
| 11,900,125 B1* | 2/2024 | Ramana | G06F 21/6218 |
| 11,947,946 B1* | 4/2024 | Rao | G06F 21/577 |

(Continued)

*Primary Examiner* — Stephen T Gundry

(57) ABSTRACT

A system and method for automation and managing of security requirements and software supply chain in a software development lifecycle in a service-oriented architecture. Shared components can be used in the implementation of multiple software applications and each component has a functionality in the application and a set of controls for its implementation. A requirements library provides a list task requirements for each application which are applicable to the software application based on application context which is adjusted based on the controls required for implementation or controls addressed by the component. The shared components in the component library can be pre-authorized for use and applied to various software projects and applications with tracking, versioning, and dependency management.

19 Claims, 14 Drawing Sheets

(56) References Cited

U.S. PATENT DOCUMENTS

| | | | | |
|---|---|---|---|---|
| 2006/0059253 | A1* | 3/2006 | Goodman | G06Q 10/10 |
| | | | | 709/223 |
| 2015/0281287 | A1* | 10/2015 | Gill | H04L 63/1416 |
| | | | | 726/1 |
| 2017/0242667 | A1* | 8/2017 | Kotman | G16B 50/00 |
| 2018/0165457 | A1 | 6/2018 | Holz et al. | |
| 2019/0114435 | A1* | 4/2019 | Bhalla | G06F 21/55 |
| 2020/0159525 | A1* | 5/2020 | Bhalla | G06N 5/022 |
| 2021/0294898 | A1 | 9/2021 | Agarwal | |
| 2021/0397447 | A1* | 12/2021 | Crabtree | G06Q 20/065 |
| 2022/0051261 | A1* | 2/2022 | Vetas | G06Q 30/018 |
| 2022/0130272 | A1* | 4/2022 | Foroughi | G09B 7/00 |
| 2022/0172149 | A1* | 6/2022 | Lowry | G06Q 10/0633 |
| 2022/0197625 | A1* | 6/2022 | Franchitti | G06N 3/08 |
| 2022/0210202 | A1* | 6/2022 | Crabtree | G06F 16/2477 |
| 2022/0232040 | A1* | 7/2022 | Crabtree | H04L 63/20 |
| 2022/0253322 | A1* | 8/2022 | Makhija | G06F 9/451 |
| 2022/0283802 | A1* | 9/2022 | Bhalla | G06N 5/02 |
| 2023/0208882 | A1* | 6/2023 | Crabtree | H04L 63/1408 |
| | | | | 726/22 |
| 2023/0305813 | A1* | 9/2023 | Jalal | G06F 9/455 |
| 2023/0393843 | A1* | 12/2023 | Touati | G06F 16/2315 |

* cited by examiner

| Profiles | Components | Project Survey | Problems | Tasks | Phases | Regulations | Content Packs | Glossary |

Built-in components

| Component Name | Description | Tags | | |
|---|---|---|---|---|
| Apache | Application server | | ⊖ | |
| Keyczar | Encryption module | | ⊖ | |
| AWS | Cloud provider | | ⊖ | |

Custom components ⊕

| Component Name | Description | Tags | Created Date ↓ | | |
|---|---|---|---|---|---|
| ACME AWS | Customized AWS Comp.. | | Apr. 15, 2020, 3:36 pm | ⊖ | 🗑 |
| ACME Auth | ACME auth library | | Apr. 2, 2020, 10:14 am | ⊖ | 🗑 |
| ACME MYSQL DB | Custom SQL DB library | | Mar. 27, 2020, 3:23 pm | ⊖ | 🗑 |

Figure 7

MySQL DB

Tasks Implemented ⊕

| Task ID | Task Title |
|---|---|
| CT38 | Apply the latest security patches (MySQL) |
| T1094 | Place MySQL data and logs on non-system partitions (MySQL) |
| T1095 | Test that MySQL data and logs are not placed on system partitions (MySQL) |

Tasks Introduced ⊕

| Task ID | Task Title |
|---|---|
| T101 | Test that application is not vulnerable to SQL injection |
| T38 | Bind variables in SQL statements |
| CT1100 | Avoid reusing database accounts (MySQL) |

Survey Answers Selected ⊕

| Answer ID | Answer Text |
|---|---|
| A1 | SQL Database |
| CA2 | ACME SQL DB |

AUTOMATED MANAGEMENT OF SECURITY REQUIREMENTS AND SOFTWARE SUPPLY CHAIN DURING A SOFTWARE DEVELOPMENT LIFECYCLE

CROSS-REFERENCE TO RELATED APPLICATIONS

This application claims priority to U.S. provisional patent application US63/260,551 filed 25 Aug. 2021, which is hereby incorporated by reference herein in its entirety.

FIELD OF THE INVENTION

The present invention pertains to the automation of security requirements and software components supply chain during software development and the software development lifecycle. The present invention also pertains to shared component integration and auditing in a software application from a library of shared reusable components.

BACKGROUND

Modern software application architectures are built with components that can be shared across many systems in an organization, such as shared infrastructure, architecture, frameworks, micro-services, application programming interfaces (APIs), and pre-built software. Shared components can be used in the development and implementation of software applications and their use can be tracked for auditing. This forms a supply chain where software is often created by using ready-to-use components, referred to as "embedded components", or has dependency on other software for its operation, referred to as "dependent components". The shared components in a library of components can be pre-authorized for use and applied to various software applications with tracking, versioning, and dependency management. In some cases the components are built in the same organization by a different team or line of business, while in other cases the components are provided by other vendors, or in the form of open source software (OSS) created and maintained by the community, optionally with customization to suit the organization in which they are being used.

Software applications can also be built on a plurality of service-providing layers, with these service-providing layers addressing certain requirements and controls for the application so that developers don't need to handle each functionality at the code level. Other software can be building in a micro-service type architecture with services and micro-services broadly distributed across various computer assets and networks. Calling on pre-established service layers and existing microservice connections can ease and simplify software development, however weaknesses can be inadvertently introduced by way of improper or incomplete integration.

A software development lifecycle (SDLC) comprises investigation, analysis, design, development, implementation, deployment, and maintenance from the cradle to the grave of a software project. Development of new software often involves incorporating existing code, libraries, and existing network architecture, each of which comes with its own set of vulnerabilities, some of which are known and others of which are unknown, not yet identified, or not yet uncovered. Identifying the required features and security requirements for any given piece of software and ensuring that developers properly address each requirement during the software lifecycle, including its dependencies and libraries, is a complex task often mediated by a multitude of standalone application lifecycle management (ALM) and project management tools. With the ever-changing electronic security landscape, software requires constant monitoring and updating to reduce security risks and prevent breaches, as well as to provide safe and secure software integration to a plurality of internal and external resources.

Identification of operational and security requirements for the duration of the software lifecycle is an onerous task, and keeping abreast of requirements, vulnerabilities, updates, and breaches can also be challenging during the software development and maintenance lifecycle. Software analysts, developers, and testers can be overwhelmed with the amount of available information and the variety of tools at their disposal. Despite known software vulnerabilities being public knowledge to both developers and hackers, software developers often lack relevant, timely, and context specific tools and guidance to help them build and maintain secure software. Many tools focus only on detecting particular vulnerabilities in the source code of a piece of software and are designed to analyze source code and/or compiled versions of code to help find security flaws and fixing a vulnerability after coding is costly and often difficult.

Further, identification and prioritization of tasks from externally sourced resources can be challenging to developers. Large repositories of security and regulatory information can be difficult to navigate, are not tailored to a specific application environment, and are often not subject to commercial grade quality controls. Having multiple large and evolving repositories of requirements also requires developers not only to identify any and all requirements pertaining to a particular application, but to keep up to date with new information and requirements. For secure software development in particular, there are long lists of task requirements, guidelines, security controls, and standards, and developers are often required to provide tangible and auditable evidence that software products comply with each of the requirements. Externally linked libraries, resources, and scripts incorporated into a software asset can also be dynamic and automatically distributed such that updates and breaches may not be immediately brought to the attention of developers. The inadvertent omission of a requirement or insufficient verification can also introduce vulnerabilities into the software asset. In addition, for an organization with many operational software assets, responding to a security threat can be a challenge if the software assets affected by the threat cannot be easily identified.

In one example of an end-to-end lifecycle application server environment, U.S. Pat. No. 10,855,620 to Mordani et al. describes a method and system having an infrastructure which enables different components within a multi-tenant application server environment to use a lifecycle plugin to provide their own component-specific lifecycle functionality.

Service-oriented architecture (SOA) is a software architectural style that supports service orientation where reusable and interoperable services are provided to various application components through a communication protocol over a network. A software service, or simply a service, can be thought of as a discrete unit of functionality or segment of functional code that can be accessed remotely and discretely. Moreover, these functional code segments can be acted upon and updated independently of the software application which uses them. SOA services generally provide a functional unit that has a specified outcome that is self-contained. Some examples of SOA services include user authorization or authentication, retrieval of documents, checking a customer's credit, calculating a monthly loan payment, and processing a mortgage application. Microservice architecture is a particular form of service-oriented architecture (SOA) whereby software applications are built as a collection of loosely coupled services or microservices, as opposed to development of one monolithic software application. Each microservice can be created independently from the others, or even in a completely different programming language, and run on its own to perform a discrete function in the application. Services and microservices, also referred to herein as components, can, once developed, be used to perform the same discrete function in more than one application.

Tools exist to reactively assess the security of various individual services or components of an application stack using static analysis, however building and maintaining security, privacy, and compliance into applications during the software application lifecycle using components or services remains a challenge. Developers as well as security auditors may also struggle to identify the specific components or teams responsible for implementing security controls and in understanding the weaknesses of systems as a whole. Threat modeling, in which potential threats such as structural vulnerabilities or the absence of appropriate safeguards can be identified and enumerated and countermeasures prioritized, can also pose a challenge when components are widely distributed. There remains a need for a system and method for capturing application operation and security controls that are addressed by components or layers that an application is built on such that propagating these controls can be easily implemented and tracked.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is the automation of security requirements and software components supply chain during software development and the software development lifecycle. Another object of the present invention is to provide a system and method for shared component integration and implementation in software applications in a software application library. Shared components can be used in the development and implementation of software applications and their use can be tracked for auditing. A shared library of reusable components can be implemented in multiple software applications or software solutions with verified operational and security controls, and a canvas or threat modeling map or diagram can be generated by each software application in the library based on its service implementation. The shared components in the library can be pre-authorized for use and applied to various software applications with tracking, versioning, and dependency management and application controls can be implemented in view of the service requirements.

In an aspect there is provided a method for automated management of security controls for a software asset, the method comprising: storing a plurality of task requirements for the software asset in a database, the task requirements directed to implementation of a task requirement of the software asset and selected from a task requirements library; ordering the set of task requirements in a prioritized task list, each task requirement comprising actionable guidance for development of the software asset; selecting at least one component from a components library, the at least one component addressing at least one task requirement in the set of task requirements and comprising controls addressed by the component and controls required to be addressed for use of the component; automatically updating the prioritized task list based on the selection of the at least one component by removing task requirements from the prioritized task list for controls addressed by the component and adding task requirements to the prioritized task list for controls required to be addressed for use of the component; and displaying the prioritized task list in a graphical user interface.

In an embodiment of the method the task requirements comprise functional requirements, non-functional requirements, and security requirements for development or maintenance of the software asset.

In another embodiment the method further comprises selecting the at least one component based on the task requirements addressed by the component in the prioritized task list.

In an embodiment of the method, selecting the at least one component is done automatically based on the task requirements in the prioritized task list.

In an embodiment of the method, selecting the at least one component is based on minimization of number of task requirements in the prioritized task list.

In another embodiment the method further comprises providing a plurality of possible component configurations for component selection.

In another embodiment the method further comprises automatically generating a threat modeling diagram indicating use of the at least one component in the software asset.

In another embodiment the method further comprises updating the prioritized task list throughout the software lifecycle when updates are made to the at least one selected component.

In another embodiment the method further comprises updating a component in the component library to effect an update to all software assets that utilize the component.

In an embodiment of the method, the component comprises metadata pertaining to one or more of component tracking, versioning, and end of life information.

In an embodiment of the method, the prioritized task list is generated for each software asset in an organization throughout the software asset development lifecycle.

In another embodiment the method further hardening the one or more component.

In another embodiment the method further containerizing the component.

In another aspect there is provided a service-oriented architecture system for automated management of security requirements and software supply chain comprising: a requirements library comprising a plurality of task requirements accessible with a retrieval tool, each task requirement comprising task guidelines and actionable guidance to orchestrate software development of a software asset; a components library comprising a plurality of components, each component providing a functionality and comprising a set of controls, the set of controls comprising task requirements addressed by the component and task requirements required to be addressed for use of the component; a prioritized task list for the software asset, the prioritized list comprising task requirements selected from the requirements library based on components in the components library utilized by the software asset, the prioritized task list adjusted based on the set of controls for the component; and a graphical user interface for displaying the prioritized task list.

In an embodiment of the system, at least some of the plurality of components are pre-authorized, hardened, or containerized.

In an embodiment of the system, the components library is distributed across one or more layers in a layered architecture.

In an embodiment of the system, utilizing the component in the software asset removes task requirements from the prioritized task list.

In an embodiment of the system, the system models use of different components to evaluate a change in risk profile or work required for the software asset in use of the different components.

In an embodiment of the system, the system automatically generates a threat modeling diagram comprising the connection of selected components.

In an embodiment the system further comprises an application library comprising a plurality of applications that utilize the components in the components library.

In another aspect there is provided a method for automated management of security requirements and software supply chain during a software development lifecycle, the method comprising: selecting task requirements for a service from a requirements library comprising a plurality of task requirements based on the context of the service, the task requirements comprising task guidelines and actionable guidance to orchestrate development of the service; selecting at least one component from a components library for use by the service, the component providing a functionality and comprising a set of controls addressed by the component and a set of controls required to be addressed for use of the component; generating a prioritized task list for the service comprising the selected task requirements; and automatically adjusting the prioritized task list for the set of controls addressed by the component and required to be addressed for use of the component.

In an embodiment, the method further comprises adjusting the prioritized task list comprises removing controls already addressed by the selected component.

In another embodiment, the method further comprises automatically generating a threat modeling diagram comprising relative locations of the selected at least one component.

In another embodiment, the service is part of a software solution.

In another embodiment the method further comprises updating the prioritized task list throughout the software lifecycle when updates are made to the used components.

In another embodiment the method further comprises updating a component in the component library to effect an update to all services that utilize the updated component.

In another embodiment, the component comprises metadata pertaining to one or more of component tracking, versioning, and end of life information.

In another embodiment, the prioritized task list is generated for each service in an organization.

In another embodiment the method further comprises regularly updating the prioritized task list throughout the service lifecycle when updates are made to components utilized by the service.

In another embodiment the method further comprises hardening the component.

In another embodiment the method further comprises containerizing the component.

In another aspect there is provided a system for automated management of security requirements and software supply chain during a software development lifecycle comprising: a components library comprising a plurality of components, each component providing a functionality and comprising a set of controls addressed by the component and a set of controls required to be addressed for use of the component; a plurality of services utilizing the components in the components library; a requirements library comprising a plurality of task requirements accessible with a retrieval tool, each task requirement comprising task guidelines and actionable guidance to orchestrate software development; and a prioritized task list for each of the plurality of services, each prioritized task list comprising task requirements selected based on service context and components utilized by the service, the prioritized task list adjusted based on the set of controls addressed by the utilized components and required to be addressed for use of the utilized components.

In an embodiment, at least some of the components in the components library are pre-authorized.

In another embodiment, the shared components library is distributed across one or more layers in a layered architecture.

In another embodiment, utilizing the component in the service removes task requirements from the prioritized task list for the service.

In another embodiment, at least one of the plurality of components is utilized by a plurality of software applications.

In another embodiment, the system models use of different components to evaluate a change in risk profile or work required for a software application.

In another embodiment, the system automatically generates a threat modeling diagram comprising relative location of selected components.

In another embodiment, one or more of the components are containerized.

In another embodiment, one or more of the components are hardened.

BRIEF DESCRIPTION OF THE FIGURES

For a better understanding of the present invention, as well as other aspects and further features thereof, reference is made to the following description which is to be used in conjunction with the accompanying drawings, where:

FIG. 7 illustrates a section of a graphical user interface listing various available built-in and custom components;

FIG. 8 illustrates a section of a graphical user interface showing task requirements and controls introduced using a MySQL DB component;

FIG. 9 illustrates a section of a graphical user interface listing component dependencies for a software solution;

DETAILED DESCRIPTION OF THE INVENTION

Figure 1:
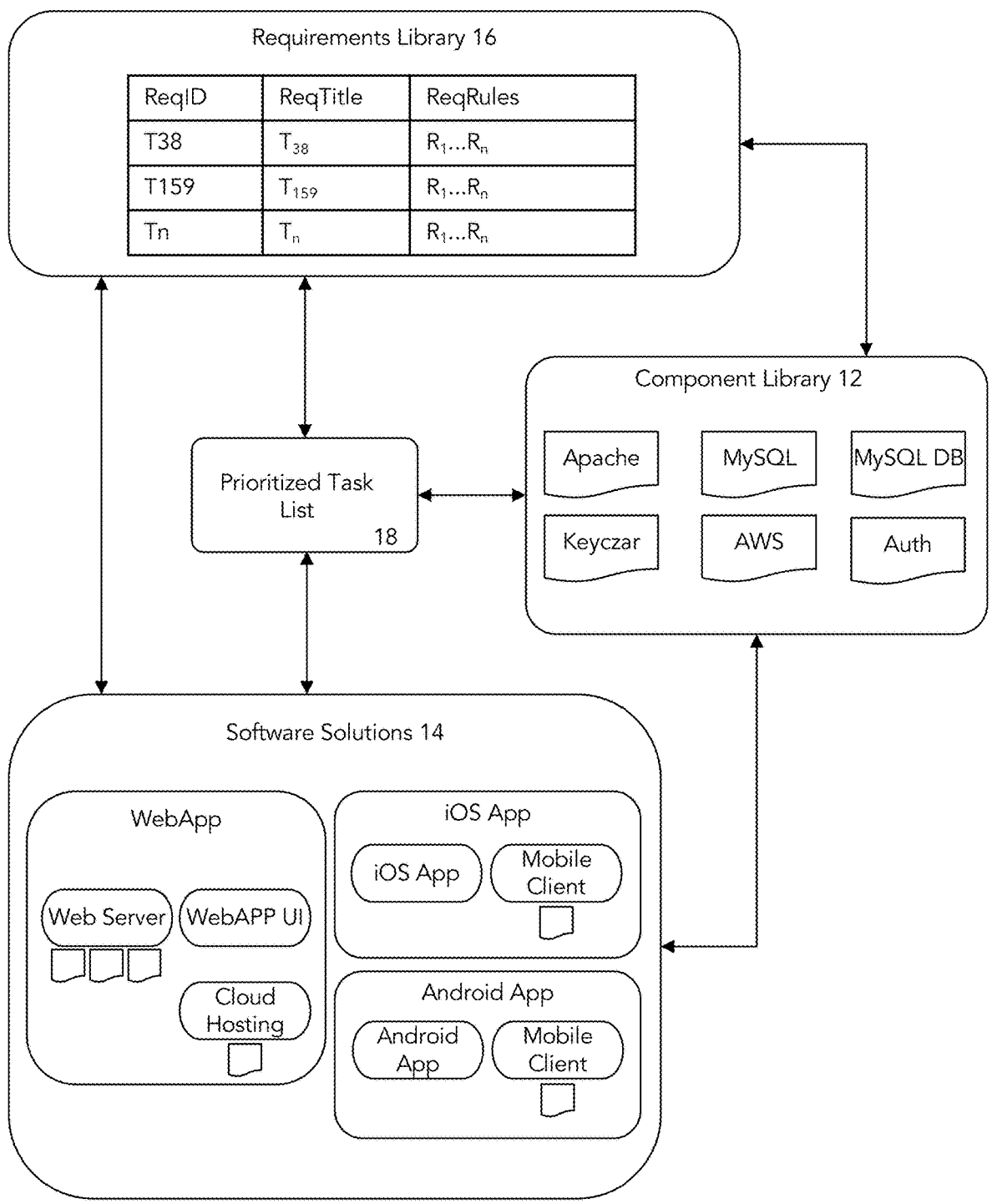
FIG. 1 is a system diagram of a shared component library integrated with a requirements library and a set of software solutions.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), and/or element(s) as appropriate. As used herein, the terms "comprising", "having", "including" and "containing", and grammatical variations thereof, are inclusive or open-ended and do not exclude additional, unrecited elements and/or method steps. The term "consisting of" when used herein in connection with a composition, device, article, system, use, or method, excludes the presence of additional elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical, electrical, software, or in communication association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

The term "developer" as used herein refers to any individual or group of individuals involved in the development, maintenance, testing, and/or regulatory aspects of a software application at any point throughout the software application lifecycle. Non-limiting examples of developers include software developers, requirements analysts, programmers, testers, project leaders, auditors, regulatory advisors, threat modelers, security analysts, and teams thereof.

The terms "context" and "software context" as they relate to software or software solutions or services, refer to the environment or properties of the software that is or contributes to a technical or operational property, feature, or condition of the software asset or project. The software context can be inferred or extracted from a context repository of the software asset, and can include the development environment, running environment, and relationships of the software to other software or hardware. Context data can be technical or non-technical and can include but is not limited to source code, system architecture, language the software is written in, dependencies, associated libraries, file locations and filetypes, running environment, development environment, descriptions in natural language of the desired features and components of the software asset, and any data extracted therefrom that pertains to the software asset. Context data can be gleaned from any repository that stores data pertaining to the software asset including but not limited to systems of record, source code, software specifications, epic systems and databases, dependency management systems, project management software, business management software, source code management (SCM) systems, configuration management systems, application lifecycle management systems, test plans, dependency libraries, and any derivative of data contained in these systems. The software context can also be gleaned from a project survey to ascertain the utility, software development environment, and running environment of the software project.

As used herein, the term "software asset" includes services, microservices, as well as software applications that comprise one or more services and/or microservices. The terms "software asset", "software application", and "software solution" are used interchangeably to refer to a piece of software that has a functionality. The term "task" and "task requirement" refers to any control or requirement for the purpose of compliance, security, obtaining a functionality, or addressing a risk. The task can be, for example, a functional requirement that enables a technical operation or functionality in a software asset, a non-functional requirement (NFR) for a system or software being designed or developed, a control that is required to secure a software asset, a compensating control that is put in place to satisfy the requirement for a security measure that is deemed too difficult or impractical to implement at the present time, and/or a requirement that specifies criteria that can be used to judge the operation and/or risk of a system.

Herein is described a system and method for automated management of security requirements and software supply chain during a software development lifecycle by incorporating a software component into a software asset from a software components library and automatically adjusting a requirements task list based on the set of controls addressed by the implementation of the component. In a software development and management system comprising multiple task requirements directed to security controls, the incorporation of a software component comprising a service or microservice can be tagged to indicate which security controls are addressed by the integration of the software component, and which security controls or potential security threats are introduced by the integration of the software component that need to be mitigated. The developer task list can be automatically updated with the integration of the software component and adjusted to remove requirements addressed by the component and add requirements introduced by integration of the component. The result is a prioritized task list that addresses the security requirements for the software asset which takes into account the presence and functionality of the component in the software asset. The present system and method can also minimize risk, effort for development, effort for maintenance, time required from developers, and enable teams of developers to work on the same software asset with a shared, updated, and accurate set of security requirements.

The present method and system can enable shared component integration into multiple software solutions and software assets in an organization, where the shared components can be individually authorized for use and stored in a library of shared reusable components with tracking, auditing, and threat modeling. The reusable components can be used in the implementation of multiple software solutions, applications, services, or projects across an organization, and can be used to address one or more requirements from a requirements library for any software application or asset. Shared components can be implemented in, for example, a service-oriented architecture (SOA), a layered architecture, other architecture, or a combination thereof, in an application server environment. Shared components can be used in the development and implementation of software solutions and their use can be tracked for tracking the addressing of security requirements, auditing, risk assessment, software development planning, and threat modeling of the software solution. The shared components in the component library can also be pre-authorized for use and applied to various software solutions, services, and projects with tracking, versioning, and dependency management. In an organization with a closed, private, and inaccessible network such as those used in high security environments, the incorporation of services from a library of authorized reusable components automatically provides guidance to developers on security controls and directs software development and management. Additionally, components that are capable of addressing existing and outstanding security controls in an existing software asset can be suggested for integration, simplifying and expediting software development and maintenance.

The present system and method is capable of capturing and tracking the operation and security controls that are addressed by the use of components or services in an application and propagating these controls without re-addressing them at the application, service, or software solution level, while maintaining and monitoring application security. To accomplish this, components used in software applications or software assets in a system or organization have a set of controls that are linked to control task requirements in a requirements library. The task requirements can be updated when new vulnerabilities become known and when the component is updated. Once a particular component is implemented in an application or software solution, the controls incorporated as part of the component can be recorded as having already been addressed in the control task requirements for the software solution. In particular, the present method and system provides, for each software solution, a prioritized task list comprising selected task requirements from a requirements library that need to be addressed to ensure software application security. The introduction of a component that addresses one or more requirements in the prioritized task list can automatically update the task list to indicate that the task requirement is addressed by the particular component integration. In this way, components that have pre-established security controls can be reused in multiple software solutions and developers can avoid duplication of work by recording that certain controls or requirements have been taken care of by way of use of the particular component. In addition, any additional controls required to be addressed when the component is employed in a software solution or service can be brought to the attention of the developer or development team through the introduction of one or more additional tasks on the prioritized task list for that software solution such that proper controls can be addressed in the use of the component.

The present system and method provides a transparent connection between dependencies and controls in a software application during a software asset lifecycle, regardless of where the dependencies exist in the software solution or software architecture. Control requirements can thereby be brought forward to developers and indicated as addressed or required to be addressed in a multi-level dependency architecture, which is particularly useful in a software oriented architecture with pre-authorized components. In an application comprising a plurality of components, services and microservices, as well as application-specific code, the present system can provide supply chain security in a software application over the software development lifecycle, from conception to maintenance to deprecation. Tracking and integration of shared components with their connection to task requirements can also provide up-to-date threat modeling maps of software solutions in the organization. Control tasks can further be prioritized depending on the state of the software solution in the software development lifecycle, and control tasks can be marked as addressed when a component piece of the software solution has been deployed that addresses the control, thereby providing improved workflow organization. This enables developer teams, as a part of a secure process of software development, to plug in the security posture of component dependencies into the control orchestration and control management solution to provide an auditing and threat modeling trail for a software solution or service such that developers can keep track of implemented controls and expose any controls that may be missing.

FIG. 1 is a system diagram of an example shared component library 12 integrated with a set of software solutions or software assets for the organization in an application library 14 and a requirements library 16 in a system architecture having shared components. An application library 14 is a software intensive asset comprised of a collection of applications or services that serves a business or functional purpose as a whole, for example within an organization. An application library 14 can comprise various software applications, software services, as well as hardware services and hardware components that work together. An application library 14 can also comprise hardware, but is managed primarily by the software and its primary function is to provide functional applications. An organization can have, within an application library 14, a multitude of software solutions or applications (e.g. WebApp, iOS App, Android App, etc.) that carry out various executable functions in the organization. Each software solution or application can also be comprised of one or more services or microservices (e.g.

Web Server, WebApp UI, Cloud Hosting, iOS App, Mobile Client, Android App, etc.) that the software solution can call upon to perform a discrete function as part of the software solution or software asset. A A service is singular piece of software, hardware, or software and hardware, that is designed to serve a specific purpose towards a larger business goal. Services can rely on other services, on other components, or use such components in their making or in their bill of materials. A service can also be created and published as a component to be used by multiple software assets or software applications. In a service-oriented architecture, each service is generally used by a plurality of software applications, and services, like components, can be thoroughly secured, hardened, and authorized for use in all applications in an organization, providing additional security to software assets in the organization that use the services. The design and code of a service is preferably transparent and in control of the software asset development process. Controls for use of each service can be implemented at the service level or at another level in the software solution. Each of the applications WebApp, iOS App, and Android App, can be thought of as services (software services), as can the microservices iOS App, Mobile Client etc. contained therein.

A component is a reusable piece of software and/or hardware that is built to be used by various services in different settings. A component can also be viewed as a discrete piece of executable code or organized collection of software code, often referred to as a library, that serves a function and has a utility in a service, microservice, architecture layer, or application. In the present system, components are stored in a component library 12, which can be one or more databases, or as a distributed collection of components with pointers to each component. Each component can have its own discrete function, or work in tandem with one or more other components to perform a task. Components can be used in an embedded format, such as by importing a library to be used in a software asset, or can be used as a dependency. Components can also be added to a software asset later during development, for example at a compile time (compilation dependency), or at execution time (execution dependency), depending on the nature of the software asset development schedule or development task list. In this way, components can rely on other components, either built-in, i.e. embedded, or as a dependency.

Components are generally considered immutable with respect to the development of the services that use such components, however components are often and preferably published along with versioning information for auditing purposes. In this way a single component used by multiple services or applications can be updated and the update can be implemented in all software applications that use that component. Versioning and/or tracking information for each component can also include various metadata, including but not limited to expiry or end of life (EOL) information. In some occasions, a component can be comprised of an external service or dependency that the software relies on, such as, for example, a remote API, provided as a service. Some examples of components in the component library 12 can include but are not limited to authentication libraries, databases, geo-location services, servers and server integration units, sets of common functions such as software development kits (SDK) or re-usable user interface components, and other toolkits. Components can also include one or microservices or services depending on the architecture of the organization. Software solutions, projects, applications, and services in the software application library 14 can also depend on more than one component, and preferably utilize a plurality of components. In an organization, components can be created internally or imported from an external provider, and each component is further accompanied by security controls required for integration of the component into a larger application, project, or service.

The present system integrates shared components into the system architecture and software solutions therein, along with their security control requirements, and provides guidance on the addressing of these requirements for maintaining security throughout the lifecycle of any software asset or software solution in the system that uses or can use the shared components. Further, each requirement also has a set of controls that are addressed in the integration of the component into the software application, and integration of the component can inform the prioritized task list 18 for the application which task requirements are addressed by the component.

The components library 12 can be a local or distributed library and can be connected to both certified and uncertified components such that component vendors can self-attest on controls that they implement, and can track the implementation with labels or flags if the component is verified, to confirm that the self-attestation is correct. This attestation or authorization can be done using, for example, code scanners, by a human, or by a combination thereof. Components can, for example, be internally certified by one team for use in one line of business, and another internal team in the organization could make use of the component in another line of business. Other components can be vendor certified and either internally confirmed as certified or not. Each component can further have traceability of certification. For example, an organization can have an organization-approved single sign on (SSO) library. However, if a team wants to use their own cryptographic authentication outside of the approved SSO, a variety of additional requirements can be added from the requirements library 16 that must be addressed and validated before the software can be approved for production or deployment. In this way, the requirements library 16 can be customized for each organization based on the internally derived controls and objectives of the organization. For the augmented cryptographic authentication or heightened organization controls, once these controls have been internally approved for either local or organization-wide use, the same can be used by other teams. As updates are made to each component, its control attestations can be performed and validated again for each version to ensure that security is maintained throughout the software solutions 14 for the organization.

In software development a variety of requirements must be met to ensure the security of the software during the software lifecycle, as well as to ensure that all functional requirements of the software asset are met. The requirements for development and implementation of each software solution depend upon the operational requirements, software context, hosting environment, software architecture, as well as the integration of services, components, and security control requirements derived therefrom. When building software applications, developers address both functional considerations, such as the core functions of the system, as well as non-functional concerns such as security, regulatory compliance, operability, and accessibility. Requirements for a software application are usually defined during the requirements or development phase of the software application, and the requirements include both functional and non-functional requirements of the software application. In this era of globalization and modern software systems, non-functional requirements and regulatory compliance requirements must also be a significant consideration during the development of software applications to ensure compliance with jurisdictional, security, and legal standards. Ensuring that all functional, non-functional, security as well as compliance requirements are satisfied is critical during the software development lifecycle, and itemizing, auditing, and tracking completion of requirements can be a challenging task. Further, each individual organization has its own organizational requirements which comprise the specifications of the goals of a business, the standards imposed by the business to all products, and the desired quality for the project. When considered together, the set of requirements for each project can become onerous and challenging for project managers to keep track of and ensure compliance to, and can put a strain on managers to ensure that all requirements have been complied with. The requirements library 16 comprises the set of all task requirements that may be required in development of any software asset. For a particular software asset, task requirements are selected as relevant to the particular software asset being developed based on the context of the software asset and desired functionality.

The requirements library 16 contains task requirements for a wide variety of software applications, contexts, and implementations, and is updated regularly to accommodate real-time requirements and security challenges. The requirements library 16 comprises a plurality of tasks, with each task having an identification of a coding requirement, security requirement, or regulatory requirement, and a recommended strategy for completion of the coding requirement, mechanism of addressing the regulatory requirement, or remediation of the security requirement and mitigating controls. The task requirements stored in the requirements library 16 can relate to, for example, general relevant security requirements, guidelines on secure architecture design, general development standards for different development platforms and technologies, sample tested code for implementing the standards, lists of security test cases and/or check lists to enable non-expert developers to systematically test security requirements, teaching modules, application life cycle management tracking, and bug tracking integration tools. Teaching modules and links to regulatory compliance requirements including, for example, Payment Card Industry Data Security Standard (PCI DSS), Health Insurance Portability and Accountability Act (HIPPA), Health Information Technology for Economic and Clinical Health Act (HITECH), Gramm-Leach-Bliley Act (GLBA), North American Electric Reliability Corporation Critical Infrastructure Protection (NERC CIP), and international privacy laws can also be provided in the task requirements in the requirements library 16 to assist developers by putting all requirements in a single location. Other tasks can relate to technology-specific advice that relates to particular standards, for example, particular advice on how to use the Microsoft Anti-XSS library to mitigate Cross Site Scripting for ASP.NET. Guidance can further be provided to different stakeholders in the software development lifecycle, and may be accessible by a standard, customized or filtered view. For example, requirements analysts can be shown or can sort for security requirements for the project, system architects can view advice or guidance on the design of the application, and testers can be shown how to test or validate completion of tasks. Tailored, relevant task requirements including guidelines and code samples for a large variety of common programming languages, frameworks, platforms and other technologies can also be provided. Positive code examples and complete code examples may be imported or shown to address a particular task. Developers can download the code examples and try them or run them for themselves, for example in an integrated development environment (IDE) such as Eclipse™, where developers can view the complete code, and even run the full program to see the standard in action.

Each task requirement in the requirements library 16 has tags delineating its relevance to a particular software context so that the tasks required for a particular software asset can be generated based on the context data of the software asset under development. Accessing the requirements library 16 can occur throughout the software development and maintenance process to provide an up-to-date prioritized task list 18 and guidance for each task which is relevant to the software asset. As the requirements library 16 is dynamically updated, the prioritized task list 18 for the software asset or group of software assets in an organization can also be dynamically updated such that risks are routinely assessed and incorporated to the guidance standards of the system. This further applies to the components used in the organization, which can be updated centrally and pushed out to software assets which use those components, with automatic updating of the prioritized task list for each software asset based on the component update. Without being bound by theory, one strength of the presently described system and method is that changes to regulations, security requirements, occurrence of malware, and security updates can be rapidly identified and updated in the software asset by updating the component that addresses the change. This automatically updates every software asset using the component and updates the prioritized task list for appropriate software asset management as well as auditing and tracking. In one example, software context identifying a dependency that is found to be susceptible to malware can be immediately escalated on the prioritized task list and mitigated efficiently by developers. In this way developers can be rapidly alerted to updates relevant to each software asset based on an update to the prioritized task list 18 and be provided with remediation guidance to mitigate risk in the software asset that is not addressed by the component or is required for integration of the component or an update thereto.

The requirements library 16 and prioritized task list 18 can be accessed directly by a user interface with a database management utility. The prioritized task list can be displayed to one or more developers on a graphical user interface in part or in whole to assist the developer in addressing the task requirements for development or maintenance of the software asset that uses the components and services or applications. A web server can also permit an authorized user to link to a web application by means of the Internet and a user interface. A user interface can be used for coding the software asset by the developer, and can be a single computing device, a plurality of computers or electronic devices being used by a plurality of developers, or a distributed network or computers comprising one or more processor and memory operatively connected to the processor, and can further be connected to the Internet. The user interface may also have access to the knowledge database 108 and be able to access one or a plurality of different projects at the same time, as well as the prioritized task lists for one or more software assets in the organization.

In this way task requirements for each software solution as well as each of the components used in the software solution can be brought forward into a prioritized task list 18 for developers to use while designing and maintaining the software solution, where the prioritized task list 18 is specific to the context of each software solution or project.

By linking each software solution or software asset and the components tied thereto to specific task requirements from a requirements library 16 that are applicable to the particular software asset, the developer team can be provided with a logical and prioritized list of issues and controls that need to be addressed to ensure the security and utility of each software solution. A set of the task requirements associated with each control required by each integrated shared component in the software solution can also be added to the prioritized task list based on the host or context of the software solution.

In addition, based on the utility and authorization status of the components employed in a software asset, as well as the connections and integrations between components, utilization of applications that incorporate the components, and the application and the functionality of context of the software solution, certain task requirements that would normally be brought forward into the prioritized task list 18 can be removed as having been already addressed by the use of these components. In particular, a prioritized task list for a particular software solution may have a set of tasks that are adequately addressed by the integration of a particular component. Once the component is integrated into the software solution, with the successful addressing of any additional controls or task that may be required, these task requirements addressed by the components can be marked as addressed in the task list by way of integration of the component. In this way, work done by developers can be minimized by incorporation of certain components into their system design. Further, the use of certain components based on the context or environment in which the application is being used can be suggested by the system, where the suggested components address one or more of the task requirements on the prioritized task list 18 for the software solution or improve the expediency of implementation or integration of the software asset through the use of the shared component based on software context. Additionally, system and application architecture can be tested ahead of development to model which components and environments create the least security risk and/or the least amount of development work to implement in the software solution, further expediting software asset development and resulting in more secure software. Threat-modeling maps and tests can further be executed in advance of software development to suggest the most expedient and most secure method of software design with the use of shared components.

A requirements library 16 comprises a set of tasks, also referred to as requirements or task requirements, which are pertinent to development and maintenance of security and utility to software projects and software assets. To automate the addressing of task requirements in a software asset during its lifecycle, actionable guidance can be generated by the present system to orchestrate software development through a prioritized task list 18 specific to the software solution to guide the development of an individual software asset and software portfolio based on the context of each computing asset in the portfolio. The context of a software asset refers to the operational environment pertaining to the software asset that is or contributes to a technical or operational property, feature, or condition to the software asset. The software context can be technical or non-technical and can include but is not limited to source code, system architecture, language(s) in which the application is written, file locations and filetypes, dependencies, descriptions in natural language of the desired features and components of the software asset, regulatory requirements, social and legal expectations, and any data extracted therefrom that pertains to the software asset. The context of a software application can be gleaned from any repository that stores data pertaining to the software asset including but not limited to systems of record, source code, software specifications, epic and requirements systems and databases, dependency management systems, project management software, business management software, source code management (SCM) systems, configuration management systems, technical identifications by a developer, application lifecycle management systems, test plans, dependency libraries, and any derivative of data contained in these systems, and can include textual descriptions of the software asset or its functionality in natural or plain language.

The requirements library 16 can be accessed and provided to developers in fragments or as selected task requirements in a prioritized task list 18 based on the specific software context of the software asset, including identification of security risks in the software asset, identification of utility required in an application or service, priority of the task, remediation, and validation of remediation. Regular updates to the requirements library 16 can be made when vulnerabilities or threats become known, and updated task requirements based on these threats can be pushed to the prioritized task list for each software asset, preferably with a priority status for amelioration or addressing. This provides cradle to grave risk identification and remediation for a software solution in a software development lifecycle and security can be integrated into the software solution from the early phases of the software asset lifecycle and maintained throughout its lifetime.

The present system also captures security controls that are addressed by components in the shared component library 12 and can propagate these controls by connecting them to tasks in the requirements library 16 such that a prioritized task list 18 for development of a particular software asset or project is adjusted to remove task requirements already addressed by the integrated components. In this way, the team implementing the application reduces the necessary work by using components that address one or more task requirements or removing task requirements already addressed without having to re-address them at the software solution level. The system can also identify work that must be performed whenever a component is utilized and, depending on the context of the target implementation, ensure security of the process of component integration into the software solution. This makes software easier to assemble because existing validated components that already address certain requirements for a given software context can be used to satisfy requirements and controls in new software solutions. Components can also be stored with component identification including metadata for detecting the component or parts thereof in source code or other systems. In addition, software development teams can take advantage of components that already have approved authority to operate (ATO) on a platform or in a software architecture or stack. Implementing a shared component that is approved in terms of operation, dependencies, configuration, infrastructure, and controls reduces the time required to develop and deploy an approved system. In an example, if an approved stack that uses an approved infrastructure and services is implemented as a part of software development then, by design, the application starts with a foundation of operational ATO components. Rooting application development in ATO components solves a lot of problems that nascent software might otherwise generate in a project or system that has not already been tested and approved. Sharing components for a plurality of projects and software solutions while fully considering the hosting environment, context, and architecture, risks, and potential security problems of each software solution can provide developers with the knowledge and tools for implementing the particular security controls required for any given hosting architecture.

The set of selected task requirements from the requirements library 16 identified is prioritized based on the task orchestration and/or risk of each of the selected task requirements to generate the prioritized task list. The prioritized task list can be stored on a computer, server, or on another electronic device or system, and can be accessed by and presented to a developer on a graphical user interface. The prioritized task list can also provide guidance on task orchestration based on a known or learned most efficient (in time or money) timeline or order to handle the set of tasks. The orchestration can result in a cascading effect of task management such that addressing of certain tasks has a greater downstream effect if identified early in the task identification process. By regularly reviewing the prioritized task list, developer and management teams can also be provided with real-time visibility of a project's verification and completion status during production. Timeline for deployment can be assessed based on the accumulated remaining tasks and goals of the organization. The present system can also be configured to update the verification status of project tasks and security status of software assets, both during software development, after launch, and throughout the software application development and maintenance lifecycle. The system can also intake or consume feedback during runtime or operation so that it can influence which tasks are most relevant to the software application and reprioritize them in the prioritized task list. Appropriate teams and/or developers can also be alerted with an alarm or alert in order to quickly respond to any feedback or changes to the prioritized task list to change focus and mitigate risk or orchestrate work according to best practices. Task prioritization can also be rapidly adjusted based on the public electronic security environment of the software asset to direct developer attention to issues that require more immediate attention at any point during the software development lifecycle. Once the application has been launched, updates to the knowledge database can trigger software asset update action tasks based on the identified software context of the application to maintain operation and security standards and mitigate risk of the software asset during its lifetime.

Task requirements in the prioritized task list 18 can automatically be marked as addressed once the control or task requirement has been satisfied by way of integration of the component that addresses the control, and the prioritized task list for each software solution can further include a descriptive note or metadata explaining the usage of the component, how the component addresses the task requirement(s), or how the control provides the service to the software solution. In an example, if a particular encryption component provides encryption to all network communication in a software solution, then encryption requirements are satisfied for the software solution as a whole by integration of the encryption component. This global addressing of controls can be particularly useful for compliance reporting, and the system can automatically generate a list of components that address the requirements and the details of how and under what circumstances each control was addressed in the software solution.

Each task in the prioritized task list can further include tailored relevant test cases and sample quality assurance test code, including tracking and audit trail information for satisfying requirement standards and audit criteria, best practice rules concerning the design of software code to produce software assets, as well as rules concerning security structures and procedures for communication on the internet and for particular businesses. For example, if the software asset is used within a financial institution having credit card transactions, the task requirements list would include regulations and control frameworks such as the Payment Card Industry Data Security Standard (the "PCI DSS"), COBIT, ISO 27001 (formerly 17799), GLBA, and the like. In another example, if the software asset is for use in the healthcare industry, privacy regulations for medical data can be put as task requirements in the prioritized task list from the requirements library 16. The task requirements may further include best practice rules concerning the design of software code to produce software assets as well as rules concerning security structures and procedures for communication on the internet and for particular businesses. For security tasks in particular, a task list with each security requirement can include tailored relevant test cases and sample quality assurance test code, including tracking and audit trail information for satisfying requirement standards and audit criteria.

A component can also introduce one or more new task requirements directly into the requirements library for its own use or for use by other components, or generally for use by context of the software asset or project. In the case where a component is integrated from an external software provider, the manufacturer can be enabled to package new task requirements into a format that can be integrated into the library of task requirements or requirements library 16. In this way knowledge management can be distributed across the components library 12 and requirements library 16, and the requirements library 16 can be expanded or added to by expanding an existing task requirement, or by adding an entirely new task requirement.

The present system is stored and run on one or more computing devices with memory and may be accessed by wireless or a wired network, or a combination thereof. The network can be a collection of individual networks, interconnected with each other and functioning as a single large network (e.g., the internet or an intranet). The network can be implemented as an intranet, local area network (LAN), wide area network (WAN), the internet, or combination thereof. The network may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. The memory may be coupled to one or more processor(s) and can include any computer-readable medium known in the art including, for example, volatile memory, such as static random access memory (SRAM) and dynamic random access memory (DRAM), and/or non- volatile memory, such as read only memory (ROM), erasable programmable ROM, flash memories, hard disks, optical disks, and magnetic tapes. The system may also include one or more processors coupled with the memory to receive the organization framework and further configured to generate system processing commands. The computing device may be implemented as one or more microprocessors, microcomputers, microcontrollers, digital signal processors, central processing units, state machines, logic circuitries, and/or any devices that manipulate signals based on operational instructions. Among other capabilities, the one or more processor is configured to fetch and execute computer-readable instructions stored in a memory.

The present system can also integrate with other application lifecycle management (ALM) tools which provide a work ticketing system to describe and prioritize developer work. In one embodiment, the organization framework or any subset thereof can be exported as a single software development guidance document or ALM tool, such as Atlassian JIRA™. In an ALM, the project framework can be synchronized with the ALM tool to allow stakeholders to push or prioritize requirements within the ALM tool into a team member's workflow. The team member can continue to work inside the ALM tool and as work is completed, the present system can be kept up to date with the status of corresponding work and requirements. A two-way synchronization between the present system and an ALM tool can enable developers and project managers to communicate and prioritize the work to team members in the system. An application programming interface (API) can also be used to build a custom application platform which can provide directed guidance and requirements particular to a project portfolio. The API gives external programmatic access to the data and behaviors of the system such that queries and instructions can be made to the system and the user can be presented with an updated task list. The team member can also export the requirements task list as a static electronic document.

Figure 2:
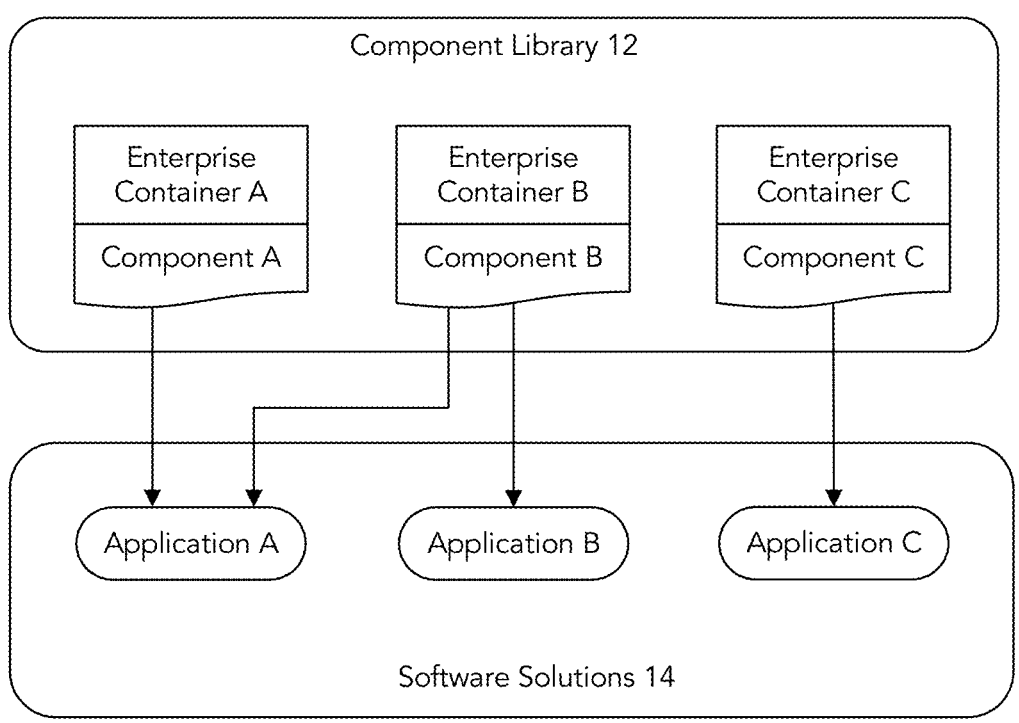
FIG. 2 is a system integration diagram of software applications in a set of software solutions with containerized shared components.

FIG. 2 is a system integration diagram of one example of a set of software applications or software solutions 14 with containerized shared components in a component library 12. Components A, B, C in the system can optionally be held in or associated with discrete enterprise containers A, B, C which each contain the runtime environment of the component, including the executable component and preferably its dependencies, libraries, and configuration files needed to run it. By containerizing the component application platform and its dependencies, differences in operating system environments can be abstracted to allow the component to run in a simplified and idealized environment. In an example, a plurality of containers can be run on a single operating system and a server can host a plurality of containers and embedded systems and their associated components. Applications A, B, C in the set of software solutions 14 can be run using one or more of components A, B, C, and updates to components A, B, C will provide updated functionality to the applications that call on them. Organizations can also use containers to avoid vendor lock-in at infrastructure and platform layers by enabling container replacement using free and open-source software together with container orchestration systems such as Kubernetes along with open container initiative (OCI) Linux-type containers. In this way, organizations can develop centralized repositories of hardened or authorized and centrally accredited containers, and control the selection, certification, authorization, and securing of the most appropriate, secure, and reliable development tools and software capabilities for use in the organization. In addition, containers can be updated, replaced, and individually secured on an ongoing basis to ensure security.

Developers and development teams can also be provided with guidance on using particular containers and the components within them, while highlighting the specific controls that are either already built into the container or component or must be added to accommodate the application layer or application context. When software solution context information and configuration requirements for the hosting environment are taken into consideration in the integration of shared components, the host and software context can be tied to the development or deployment environment where the application is run. This integration at the ALM and development stage guides developers in the implementation of required controls to secure the software solution. Characteristics of the development environment of different software solutions can also vary based on the software context, employed application layers and containers, and integrated components, as well as the hosting environment. Taking these into consideration during integration allows coordinated identification of risks and security issues in the software solution throughout the SDLC.

Figure 3:
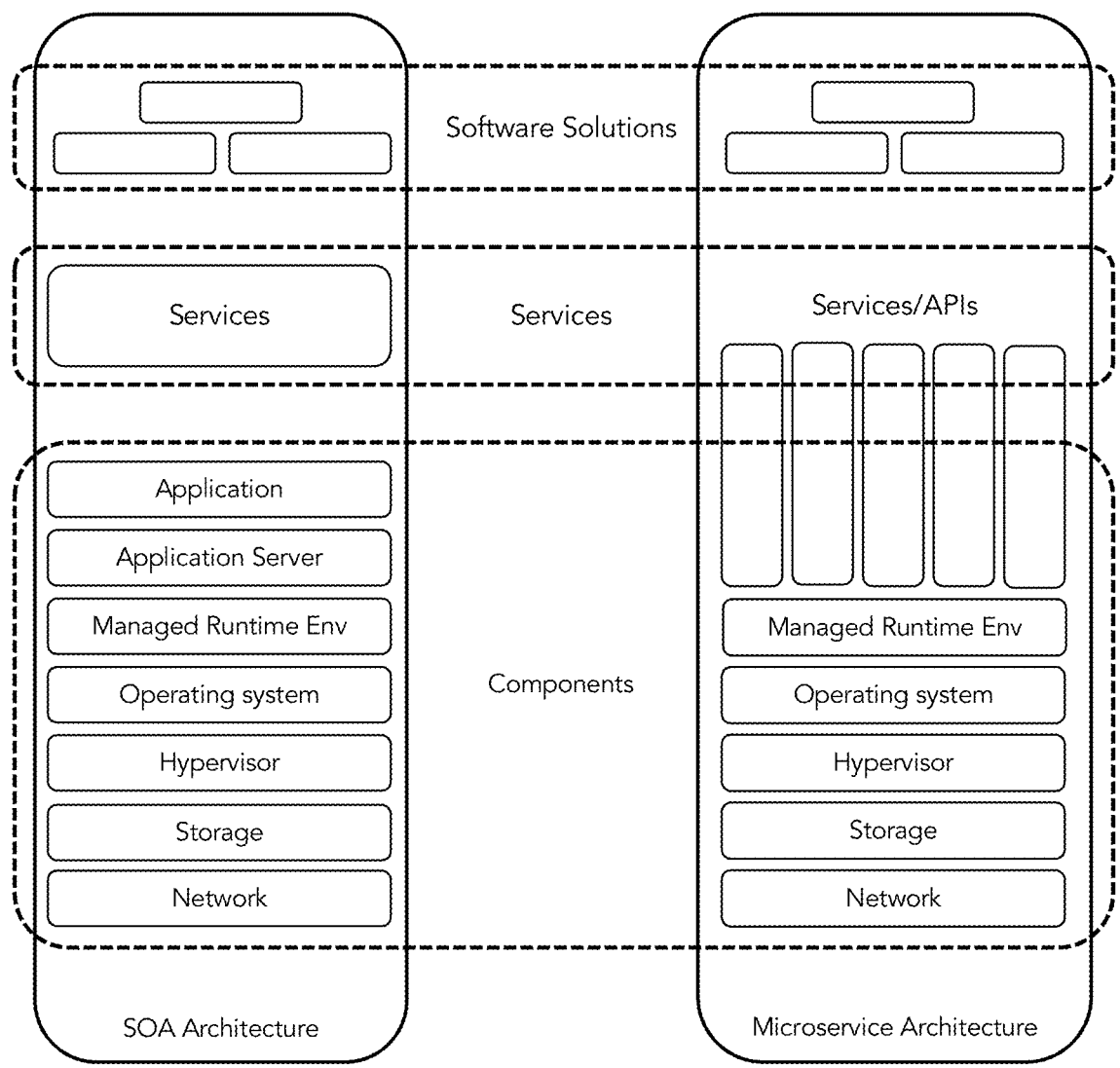
FIG. 3 illustrates the relationship between software solutions, services, and components in a coupled service-oriented architecture (SOA) and microservice architecture.

FIG. 3 illustrates the relationship between software solutions, services, and components in a coupled service-oriented architecture (SOA) and microservice architecture with shared services or components. In the example provided, a software solution is a software asset or software application with technical and non-technical context fulfilling at least one use case and composed of one or more components. A component can depend on and make use of other components, services, microservices, as well as have one or more dependencies. Each software solution can incorporate or utilize many components, some directly and others indirectly. Embedded components are components that are included in or integrated into a software solution. Components can also be comprised of dependencies that are referred to or used outside of or external to the software solution. A software solution can also comprise and/or call upon and employ a collection of services and components. The risk profile of a system as a whole is the union of the risks corresponding to each of its software solutions, services, components, dependencies, and integrations thereof. Accordingly, the set of controls implemented for a software solution is the union of controls implemented for each of its services and components. Therefore, the choice of components used within a software solution or service affects the overall risk and control profile of a system.

Controls for software solutions provide best practices for securely configuring a piece of software using external components, however not all controls can be determined easily by the utility of the component. The code produced for the software solution must also consider where the software solution is going to run to ensure security, also referred to herein as the software context. In one example, a very secure component can be used in a development environment for software development, however the same component may need to be configured differently for the running environment to ensure security. Another issue may be introduced if logic is missing at the application layer that introduces a vulnerability or increased risk. Technical guidance can be provided to developers to clearly define the controls required to securely and properly implement the components based on the environment and properties of the software solution in the way of tasks to be addressed by way of implementation of the components, which are added to the prioritized task list. In addition, a component can introduce a task to the requirements library if it doesn't already exist, and also add it to the prioritized task list of the software solution to ensure that it is addressed during development.

In another use, the system can suggest components for addressing a particular task that are appropriate for use in a given environment or context and with defined software properties. This analysis can be part of a threat modeling of the software solution project or part of the context analysis in view of the components available from a component library. If a particular component is used in the software solution and the proper controls are implemented, then security can be confirmed for the use of that component. A component can, for example, take care of certain controls when it is part of a software solution or software project. In an example of a project run on the Amazon Web Services (AWS) cloud, certain pre-authorized components can take care of authentication or authentication throttling, and a developer can simply implement these components to address these utility requirements for a particular software solution. With implementation of this component, a list of controls or task requirements is also required for integration to provide both the desired utility as well as security. In this example, an AWS cloud integration component has a utility, i.e. what the component does, and the present system can bring forward to the developer a list of controls as task requirements that require implementation as a part of integration of the AWS cloud component into a software solution. With shared components that already have ATO, the use of shared components and identification of the required controls can save a lot of developer time as well as address security in the earliest stages of software development.

Figure 4:
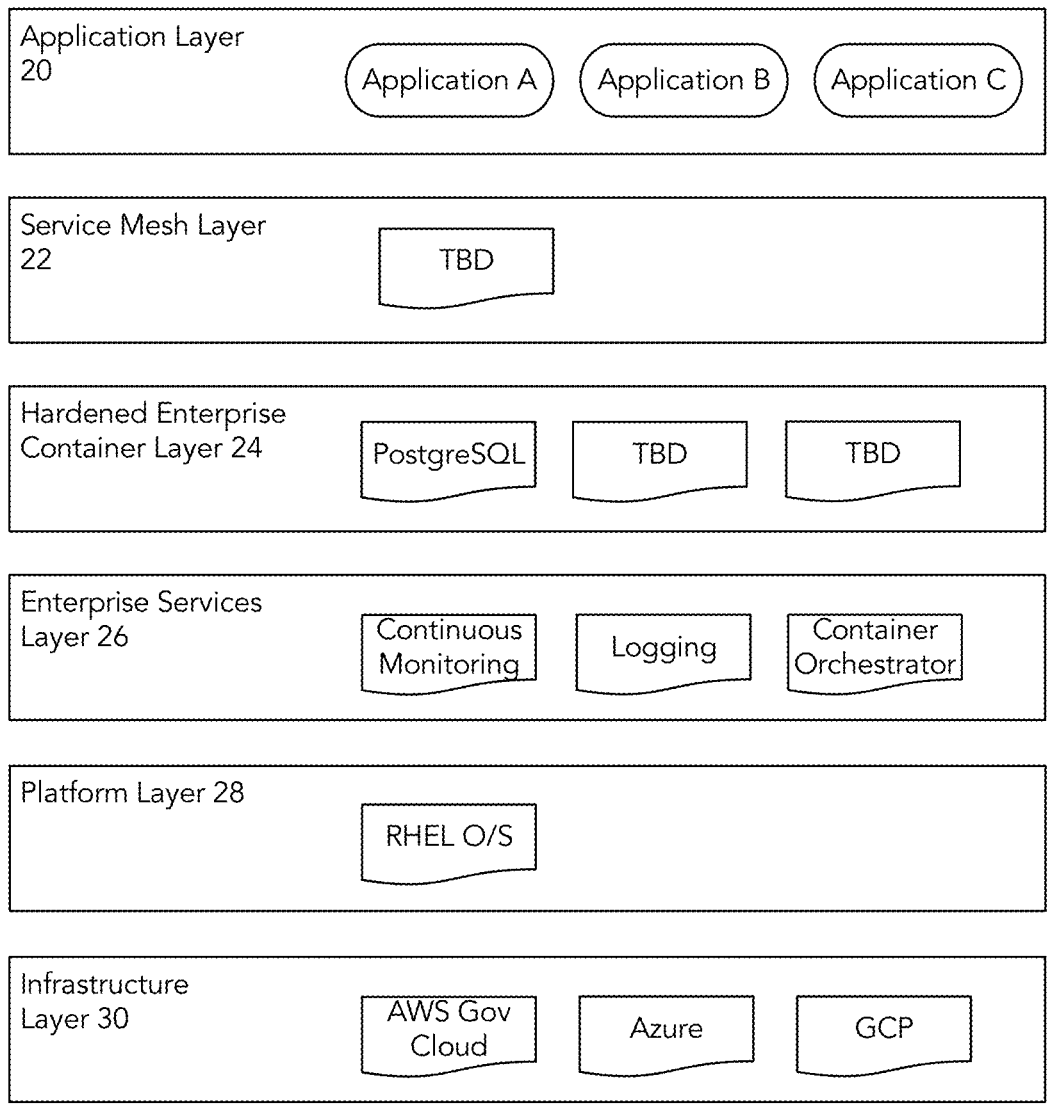
FIG. 4 is an example of an organization of layers in a production environment.

FIG. 4 is one example of layer organization in a software production environment. Shown is a stack having an Application Layer 20, Service Mesh Layer 22, Hardened Enterprise Container Layer 24, Enterprise Services Layer 26, Platform Layer 28, and Infrastructure Layer 30, which provides one possible embodiment of layer organization for the present system. In this embodiment, an Infrastructure Layer 30 is the base where a software solution is deployed and acts as the primary interface through which all activity passes through. All other layers run on top of this layer and processing by computer hardware is performed in this layer. The Platform Layer 28 is the interface through which a software solution interacts with the Infrastructure Layer 30 and other software services and assets. The Enterprise Services Layer 26 is a set of already-deployed services that provide specific functionality which aid in the functioning of a software solution or part thereof. Hardened Enterprise Container 24 serves as an immutable service providing custom functionality in addition to the Enterprise Services Layer 26. Service Mesh Layer 22 acts as a gateway for the software solution to access custom or standard functionality exposed by the Hardened Enterprise Container 24, Enterprise Services Layer 26, or other service available within the Infrastructure Layer 30. The Application Layer 20 is the domain where a software solution is deployed and run. The Application Layer 20 functions according to the commands initiated by one or more service or function hosted on top of the Infrastructure Layer 30 or externally by a user or other system. External interaction is made possible by the Infrastructure Layer 30, since it is responsible for exchanging commands and data between services and functions running on top of the Infrastructure Layer 30 and systems hosted on other networks connected to the Infrastructure Layer 30. In a platform or layered architecture, the hosting environment, configuration, context, and all layers upon which the software depends can be incorporated into the present system to provide the sum of controls required for software implementation. In the present example, components in the Hardened Enterprise Container Layer 24 can provide an organized and containerized organization for added operational control, efficiency, and security.

Taking the development environment and running environment of the software solution into consideration in assembling the list of required implementation controls increases security by evaluating risks at multiple levels of software engagement. This is especially useful in deployment because hosting characteristics can be different from the development environment and introduce new risks not identifiable during development. In one example, if a software solution is in an unclassified space but has controlled information, it is critical that the software configuration have environment-specific controls to protect the controlled information in the deployment environment. As software developers are not knowledgeable on all aspects of all of the different environment configurations, they don't always know how to incorporate all appropriate software controls for any given deployment environment, or even be able to identify all of the required controls. In the case where a container-orchestration system is used for automating computer application deployment, scaling, or management, such as Kubernetes or Docker, different types of control are introduced for orchestration than for a development environment. In one example, if a service mesh is implemented into an infrastructure layer for facilitating service-to-service communications between services or microservices, the integration needs yet different controls to ensure security. Open-source relational database management systems, such as PostgreSQL, also known as Postgres, can also be used to provide extensibility and SQL compliance, for example in architecture layers or in approved containers as a production-side component. It would be impossible for developers to be aware of all of the controls required to employ components in this complex architecture into one or more deployment environments with variable software context, and the present system brings forward the required controls during development to provide more expedient development and improved security.

Software development solutions utilizing web services-based approaches can be modelled by this system to more effectively track the initial and on-going risks and work associated with the host software asset and its dependent web services. In another approach, such as in monolith-developed systems, a software asset can be separated into logically different areas and expressed by the system. The risks and work associated with such a monolith application would be expressed as a single project and its logically-dependent components. In another instance, where a software solution is deployed as different logical components in different environments, where its front-end component running in a user's web browser, its middleware network-based application programming interface (API) component running on Microsoft Azure, and its database component running in on AWS, the sum of components makes up the totality of a single software solution application. The system can express the total set of risks as the union of the controls introduced by all of the utilized components. In this layered architecture components can exist in different layers that the service software can use, and each service can use different combinations of components. This structure makes it straight-forward to compile the control inheritance and the effects that each component brings to the overall system to see the aggregate of inheritance. In addition, the system can be modeled prior to deployment to see what would happen if a component is changed, for example swapping AWS Cloud for Azure. The inheritance can then get recombined and a new set of requirements can be identified to accommodate the change of component. In this way work can be optimized to select particular components to address the required controls in an environment-specific context.

In another specific example, the Iron Bank repository is a United States Department of Defense (DoD) Centralized Artifacts Repository (DCAR) comprising digitally signed, binary container images including both free and open-source software and commercial off-the-shelf software. All artifacts in the Iron Bank repository are hardened to reduce vulnerability in software solutions, applications, systems, infrastructure, firmware, and other areas, and to reduce security risk by eliminating potential attack vectors and condensing the system's attack surface. Containers accredited in Iron Bank have DoD-wide reciprocity across classifications and include Kubernetes distributions, infrastructure as code playbooks, hardened containers, components, and other structures. In the present system, once a component has been hardened in Iron Bank it is accompanied by a set of controls for use of that hardened component in particular environments wherein implementation of the controls maintains the hardened secure status of the component. Code scanners can also be deployed during production and development and/or after deployment to confirm controls implementation.

Figure 5:
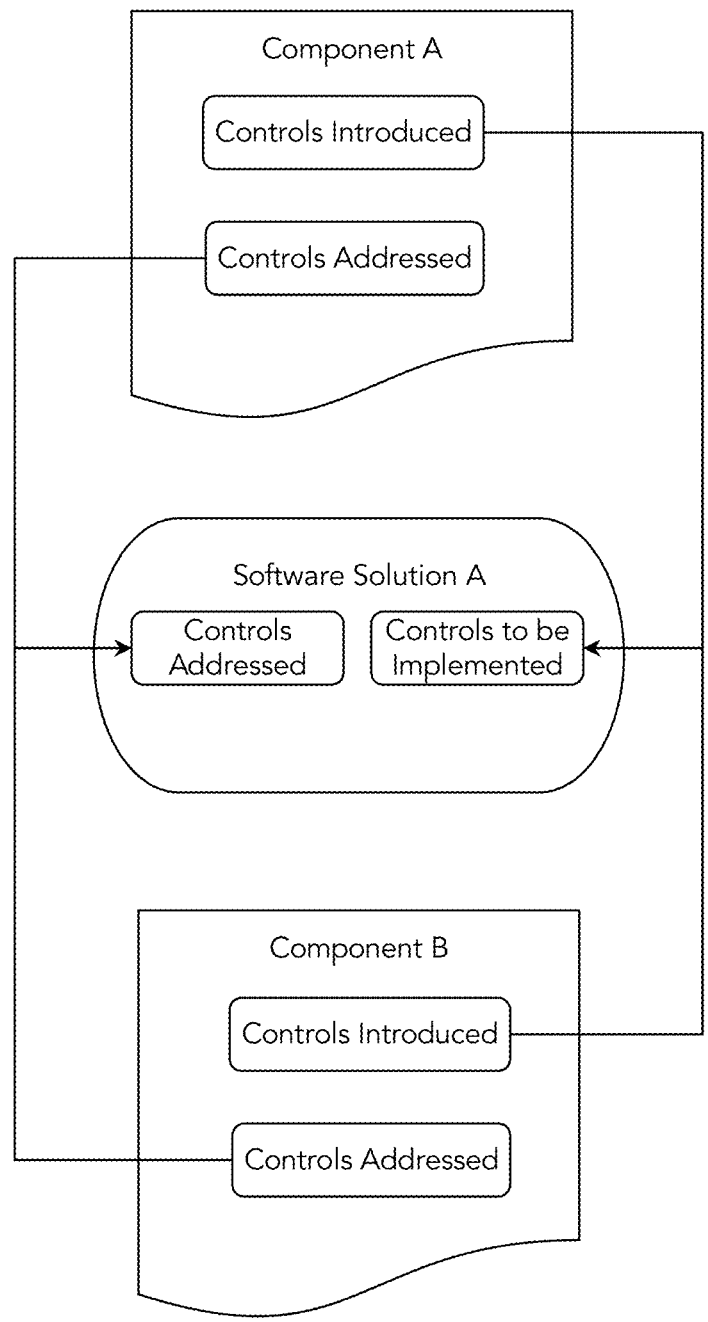
FIG. 5 is an illustration of an integration of multiple components in a software application.

FIG. 5 is an illustration of an example integration of multiple components to a single software solution. Software Application A has a software context particular to its software and deployment environment and depends on Component A and Component B for utility in the software. In addition to the utility provided by each of Component A and Component B, Component A and Component B also have controls or task requirements that are addressed by each component and controls or task requirements that are required to be addressed in the use of each component to maintain security and reduce risk upon deployment. The present software lifecycle control system enables all of the required controls to be pulled into a single prioritized list of task requirements for the specific software solution so that developers can be aware of controls that need to be addressed by the use of the selected components. Additional components can be implemented into the application as needed, and can either be created manually or custom for the software solution or imported pre-created, for example, from a component library. Each component can be added to the software solution project as a dependency, where the addition of each component is accompanied by a set of controls which is implemented as a list of task requirements in a prioritized task list, with task requirements preferably taken at least in part from a requirements library. The task requirements in the prioritized task list will be marked as completed when the component is implemented and all controls required by the component have been addressed in the software solution. In addition, any task requirements in the prioritized task list that are addressed by the used component can be marked as "addressed" in the prioritized task list for the software solution.

The context of the software Application A can also be taken into consideration when components are integrated, and the requirements of component integration can be considered in view of the application environment to provide a task list of control requirements for secure integration. In an example, consider component A, which introduces control T1 into the controls to be implemented for the integration of component A into software solution A only if the software context of software solution A contains a certain context. In an example, if the target deployment of software Application A is Microsoft Azure, which is the build and deployment environment being used for software Application A, then the controls to be implemented will include appropriate integration controls for secure operation of software Application A in the Microsoft Azure environment. An auditing record of the details of how each task requirement was addressed by the use of a shared component can be stored for tracking and reporting, including information on when the task requirement was closed, who closed it, what was done to close it, and what, if any, additional task requirements were opened by way of taking the action to address the task requirement. The auditing record can also provide information on the overall risk posture of the software solution asset based on which task requirements were addressed, and in what manner they were addressed, such as when and by whom. Knowing the overall risk posture as well as more granular information on each addressed control for any given software solution can enable informed decisions to be made about additional controls that may be required in the software asset throughout the software lifecycle. In addition, the entire risk profile of the software solution can be determined given all of the risks and controls that have been implemented in the system.

Figure 6:
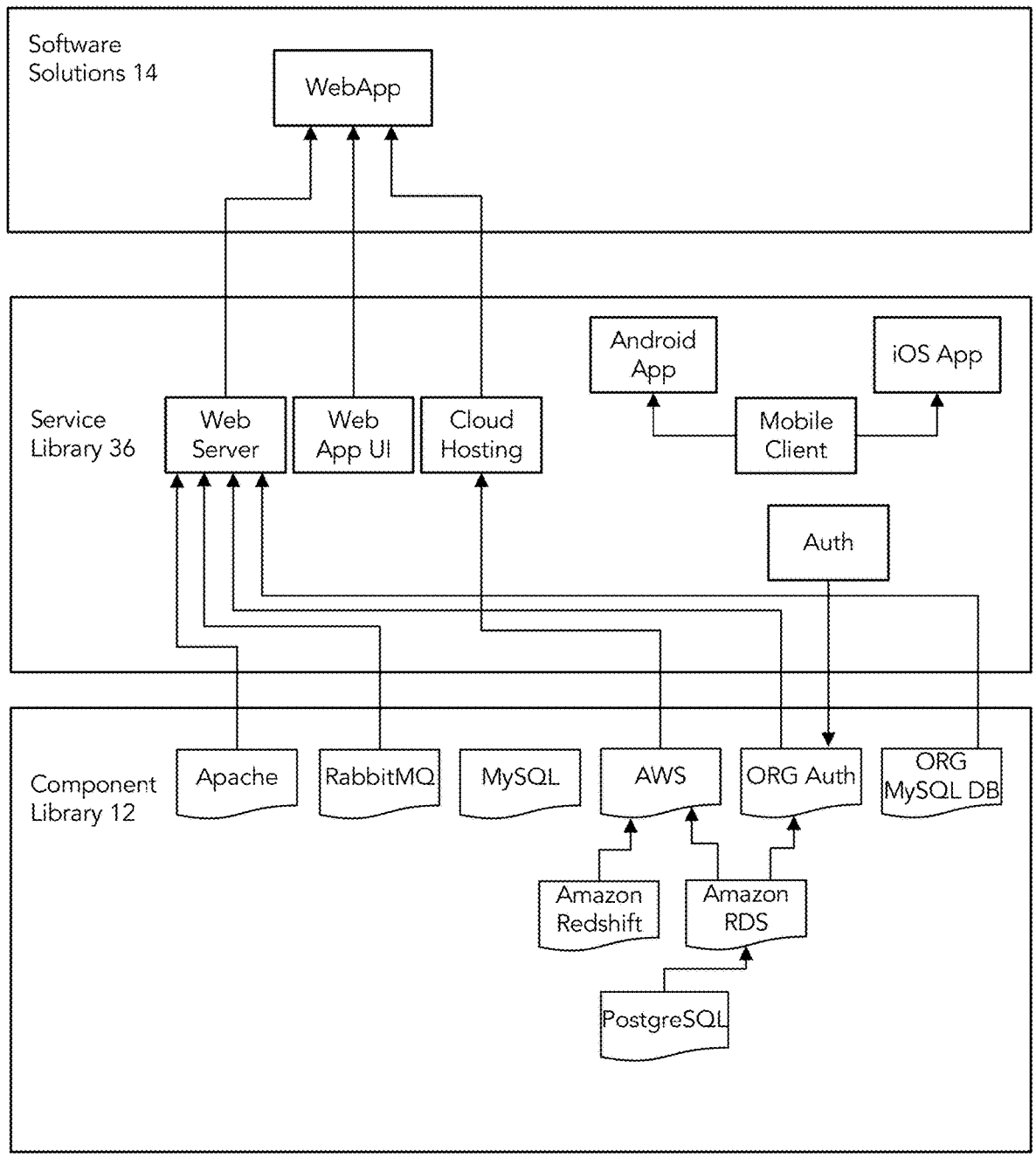
FIG. 6 is an example architecture hierarchy of components, services, and software solutions.

FIG. 6 is an example architecture with a hierarchy of components, services, and software solutions in an organization. Components can be tailored for the organization and/or modified to suit the needs or controls of the organization. Multiple components from component library 12 can be used in multiple different applications in the set of software solutions in application library 14 of the organization. A service library is a set of related services, which are also software assets, that provide complementary functions that implement a part of a system. Application library 14 is a set of software solutions or software applications in the organization. A variety of applications (Apps) in the set of software solutions in the application library 14 can use the same shared components and services from the component library 12, however each software solution or software application requires different controls based on the different deployment environment or context of each software solution. As a result, each software solution in the set of software solutions in the software application library 14 will have different task requirements, as each has different software context. Each software solution will also import different controls into the prioritized task list as a part of the task requirements for the software solution based on the services and components integrated into it. Components will also import additional metadata, including, for example, dependencies for the software solution and their risk and/or control status.

In one implementation, for example, a control can comprise a tuple [Ti, status] where 'Ti' is a regulatory, non-functional requirement, best practice, mitigation, or standard, and 'status' is a completion indicator such as 'complete' and 'incomplete'. In this example, consider that a component introduces controls [T1, incomplete], [T2, incomplete] and addresses T3, T4 for the WebApp software solution. The prioritized task list for the WebApp software solution before integration of the component will be composed of requirements [T3, incomplete], [T4, incomplete], [T5, incomplete]. However, when the WebApp software solution incorporates the component its prioritized task list becomes [T1, incomplete], [T2, incomplete], [T3, complete], [T4, complete], [T5, incomplete]. Thus integration of a component can shorten the prioritized task list for a software solution such that required controls are implemented. A system model can also provide insight into which of a selection of components in the component library 12 can address particular controls or tasks, with priority on more labor-intensive or higher security tasks or controls. The term functional requirement generally refers to specific behaviors in or of the system that perform specific and technical tasks. The term non-functional requirement refers to a requirement that specifies criteria used to judge the operation of a system and define how a system is supposed to be, and are generally in the form of "the system shall be <requirement>", wherein the requirement is an overall property of the system as a whole or of a particular aspect and not a specific function.

The shared components in the component library 12 can also be used in traditional ATO components, where each component is authorized at a given moment in time, as well as in a continuous ATO process whereby regular and ongoing authorization is applied to the component to ensure security. In traditional ATO, the present system can provide output to prepare and assist with submission of the ATO package with all of the required traceability, including information on the timing and method of last authorization. In continuous ATO, the present system can assist with risk management by creating visibility and ensuring that the right components are being used in the development and authorization of a software solution that will result in secure software, with supporting documentation during development. The present system can also provide a mechanism for automated generation of an architectural or data flow diagram or for the purpose of threat modeling activities. The relative location of components in the aforementioned diagrams can also assist developers with identification, enumeration, and actionable mitigations that can be prioritized, optionally in the prioritized task list by creating threat model diagrams or maps. These threat model diagrams can be, for example, list-based, or be a structured graphical representation of a threat model, such as a threat tree, flowchart, or data flow diagram.

In use of a components library, components can be selected or suggested for selection based on the task requirements in the prioritized task list for a particular software asset. In an example, a variety of tasks may be required to implement the functionality desired, and the system can recommend or select a component in the component library 12 that satisfies the desired functionality. There may be multiple available components that can satisfy the same functionality, and the system can further select or offer for selection one or more component as a component configuration that provides the desired functionality and addresses the task requirements in the task list. Selection can be done based on, for example, number of tasks on the task list addressed by the component, amount of time saved by incorporation of the component(s), security risk, or other criteria. Developers can then allow the system to automatically select the component configuration, review the suggested components and select for themselves, or a combination thereof, and different configurations of components will have a downstream effect on the prioritized task list based on controls addressed and controls introduced by the integration of the one or more selected components. The component configurations can also be automatically scored by one or more of developer time to implement and security risk based on information in each task requirement introduced or removed to assist developers in choosing the best component configuration for the software asset.

FIG. 7 illustrates a section of a graphical user interface listing various available built-in and custom components that may be utilized in a software application or software asset. Built-in components are provided by the system, representing components reflecting industry-accepted and other publicly available or standard libraries, software development kits, deployment environments, web services, or similar. The list of custom components can be modified and based on a user's or organization's own set of components. Other libraries of components that may be available from, for example, trusted vendors or providers, can be brought forward as available for integration into a software solution with appropriate controls.

FIG. 8 illustrates a section of a graphical user interface with task requirements and controls introduced using a MySQL DB component. The MySQL DB component is a dependent component implemented in a software solution or software application, which is an open-source relational database management system. The MySQL DB adds to the software context of the software solution, and using the MySQL DB component requires specific integrations to ensure the security of the software. When the MySQL DB component is indicated as being used by the software solution, task requirements are generated either from selection from a task requirements database or by direct addition to the prioritized task list for the software solution by integration of the component via associated metadata. The task requirements brought forward by using the MySQL DB component can also be marked as complete if the same task requirement already exists in the task list and has been indicated as complete or addressed. Any duplication of task requirements on the task list that may be required by more than one component can thus be eliminated. For software solutions that utilize two or more components that each require implementation of the same requirement, for example T101, the software solution can consider its requirement T101 addressed if and only if all instances of T101 are addressed by its dependent components. Introduced tasks are added by dependent components regardless of how many times they are shared by other components. Task requirements relating to dependent components requiring additional controls will be added to the prioritized task list. A project overview page or threat modeling diagram for each software solution can show a list of all dependent components and relative locations or connections of each. Software solutions can also be part of one or more system object in the system. In one example, if an underlying container automation system automatically encrypts all data in transit for intralayer communication then the same encryption does not need to be coded for explicitly in the application layer. If the encryption component has already been addressed in the requirement for data encryption in intralayer communication, then the only additional integrations required are to address the controls particular to the context of the software solution.

Architecture scenarios can also be run on the software solution to understand the impact of the security and risk posture of the software solution so that informed decisions can be made, for example regarding preferred environment for deployment, and time and expense for upgrading, tailoring, addressing new requirements, or replacement. For example, if a component has been certified in a particular system, such as AWS Gov Cloud, it is useful to understand whether another system environment, such as Azure, is an option for deployment, and what ramifications changing the system environment will have on the development and deployment of the software solution. If a developer team wants to decide if Azure deployment is an option, the present system can provide the information on which controls would be missed or gained by switching running environments, or what kinds of controls would have to be compensated for by changing running environments. In another example, if an application is deployed on a discrete vehicle such as a submarine or military application which has a completely different stack and in the absence of a cloud, it is important to know what would happen from a risk perspective and to know what controls need to be implemented to ensure security and reduce risk in the different running environment. By understanding which controls are addressed as a part of the layers or components in the system being designed the development team can focus on the controls that are not already addressed. Modern software uses a lot of ready-to-use infrastructure layers and components, and in the present system developers can focus on the infrastructure that needs to be implemented to properly address the required controls.

Figure 9:
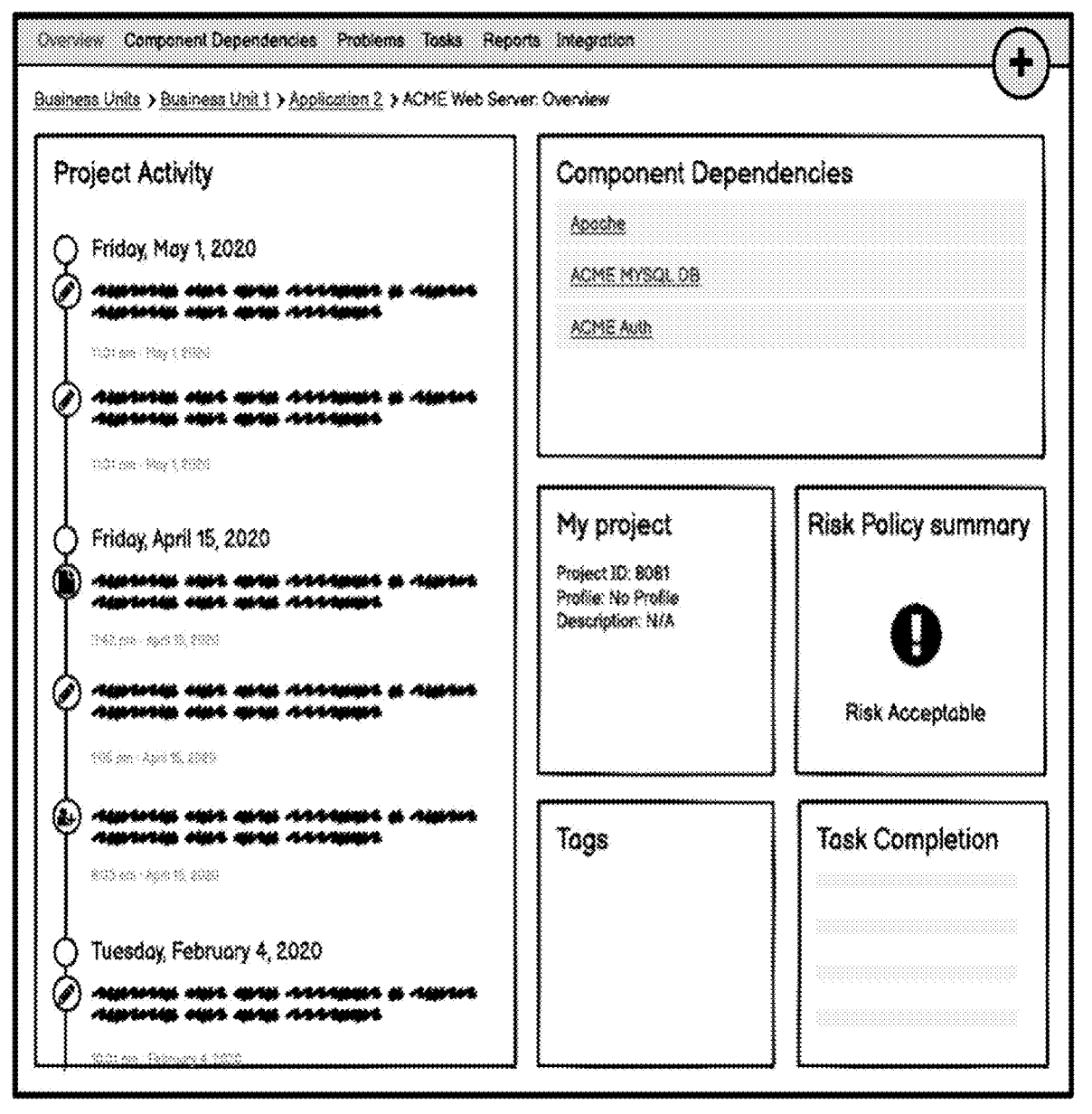

FIG. 9 illustrates a section of a graphical user interface listing component dependencies for a software solution. A project dependency can be added during project creation for the software solution, after profile selection, during a survey, as a result of survey answer mapping, as a project dependency during development, or in another manner. The present system can calculate and provide the security and compliance posture of software solutions in the organization by aggregating data from the components that it is composed of in the form of a risk policy summary, optionally with an overall score based on known controls to help quickly assess risk. Quickly assessing the inherent risk of architectural changes, such as shifting from an on-premise application to cloud, or moving from one cloud provider to another, can expedite development as well as provide options for the development team for risk reduction.

Figure 10:
FIG. 10 illustrates a section of a graphical user interface listing component dependencies for a software solution including controls and completion status.

FIG. 10 illustrates a section of a graphical user interface that lists various component dependencies for a software solution, including its controls and completion status. The component dependencies for the software solution are shown alongside the number of task requirements needed by each component to address all of the controls. The 'task added' column for each component provides the developer with additional information regarding the work required to integrate each component. In this view, a developer can add and/or remove components to assess any impact on the risk status of particular component integration before committing the changes. In one example, a developer can consider a variety of potential components for integration and compare the integration and risk profile of each before making a decision of which component(s) to use. In the past, risk avoidance has relied on risk attestation by developers. Identifying controls that can be addressed as part of each of the layers used in the software project enables the development team to focus on the controls that need to be implemented and minimize work by selecting the most expedient and balanced route for application development and security. Architecture scenarios can also be run to understand the impact of the use of various components on the security posture of the software solution. In this way, layered compliance and controlled inheritance of compliance can be built into the software asset at all stages of the software development lifecycle.

Figure 11:
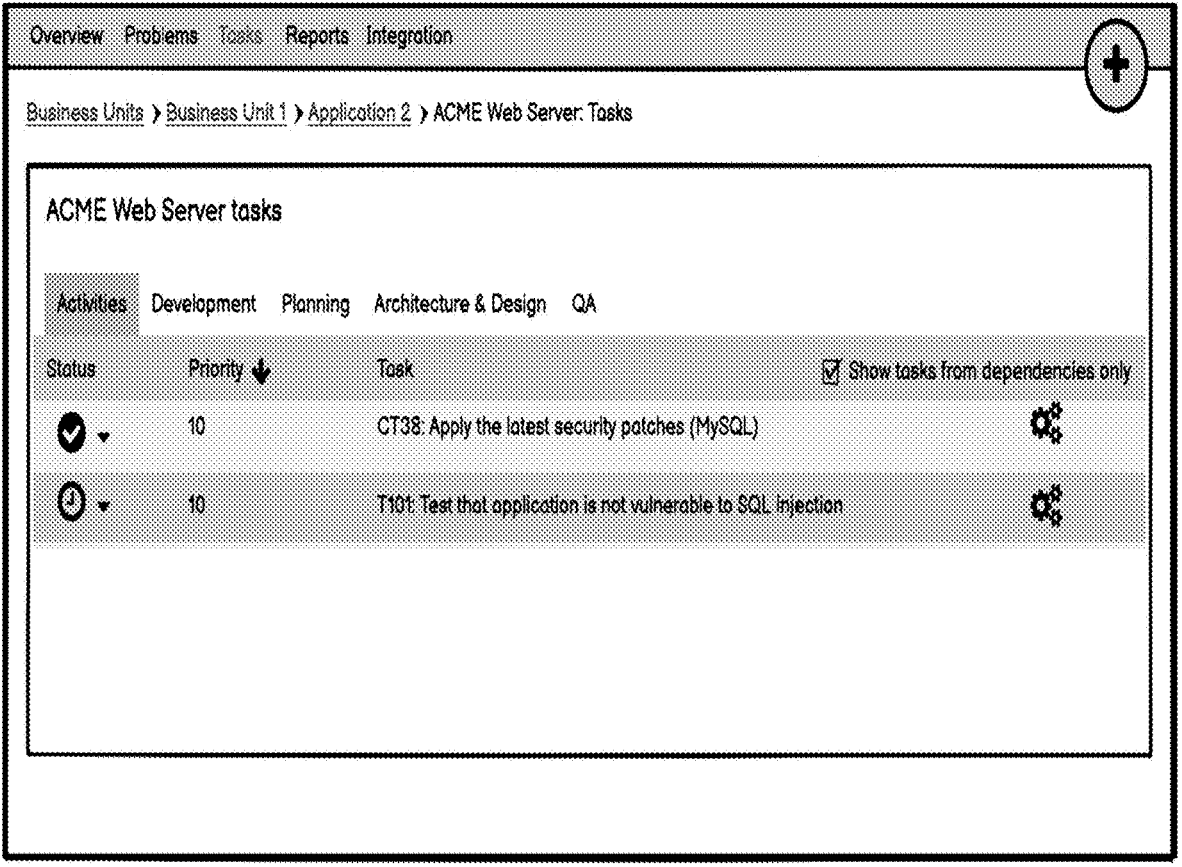
FIG. 11 illustrates a section of a graphical user interface listing control tasks and priority for a component integration into a software solution.

FIG. 11 illustrates a section of a graphical user interface listing control tasks and priority for a component integration into a software solution. When a new project is created in the project library for a software solution, a list of task requirements is added from a requirements library based on the software context. Each task requirement has a completion status, with the aggregate of completed and uncompleted tasks contributing to the overall software solution risk status. A system overview can show the list of software solution projects with its corresponding risk status and task requirements. Further inspection provides the list of task requirements related to each component integration and the status of task completion for each task requirement. A diagrammatic view or threat modeling map can also be provided to contextualize each project and its dependencies and provide insight into potential threats, structural vulnerabilities, or the absence of appropriate safeguards. Shown is one example ACME Web Server component and list of task requirements required for integrating this component into a particular software project.

Figure 12:
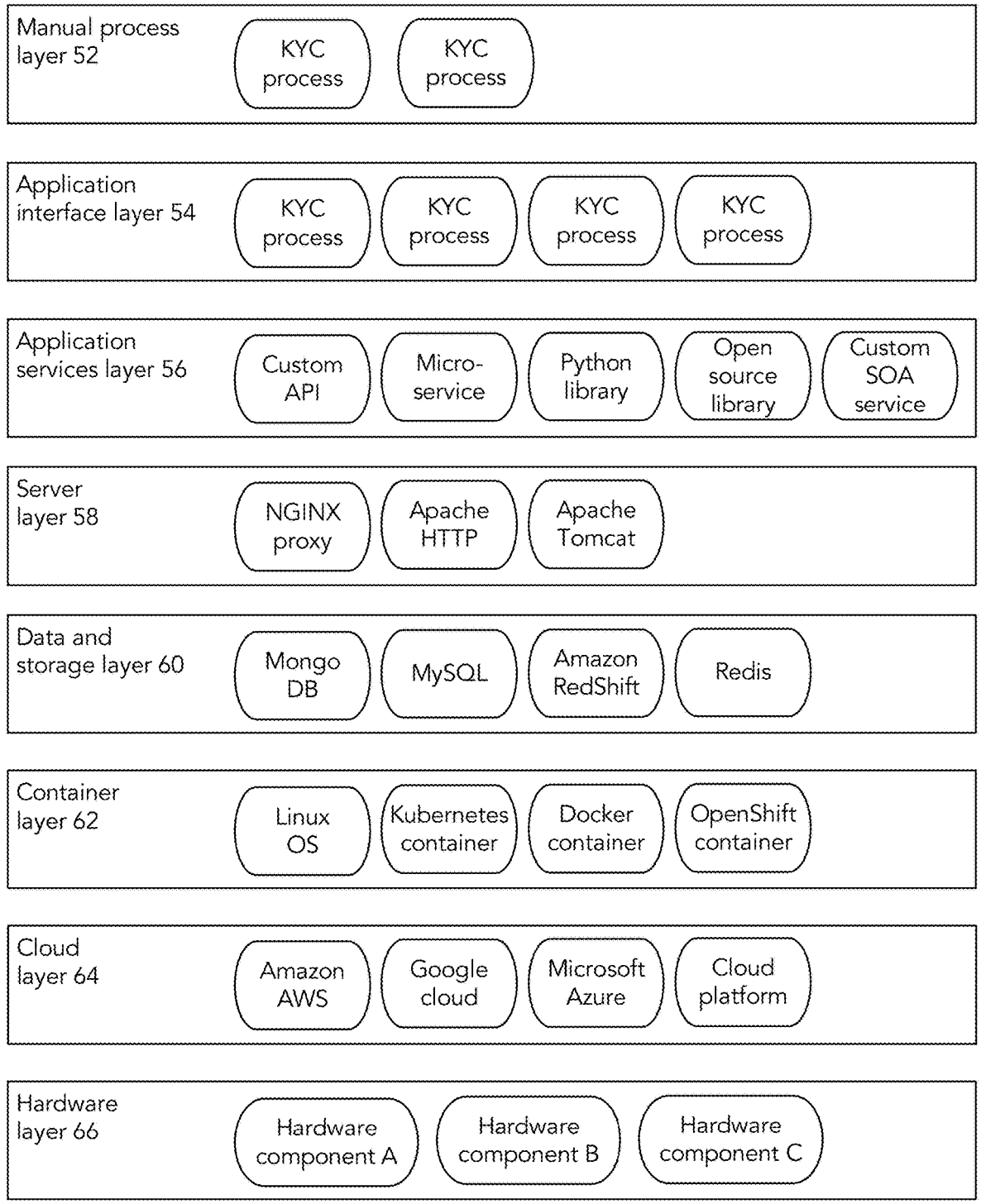
FIG. 12 is an example of an organization of layers in a production environment.

FIG. 12 is another example of an organization of layers in a production environment. This example system comprises a Hardware layer 66, Cloud layer 64, Container layer 62, Data and storage layer 60, Server layer 58, Application services layer 56, Application interface layer 54, and Manual process layer 52. Although this example architecture is shown with service oriented layers, it is understood that the described system and method can also be used in other architecture formats, including microservice open architectures and other non-layered architectures. In this layered architecture example, implementation controls can be implemented at one or more layers. Controls are in scope for a layer if at least one software solution, service, or component requires implementation. In one embodiment, a control C1 in scope in Cloud layer 64 is not relevant to lower levels and an implementation is therefore not required in Hardware layer 66. For this system to satisfy control C1, it must be implemented in Cloud layer 64 or in every higher layer. A control is satisfied in a layer if every software solution or component implements the required steps. In so doing, a complete risk and control profile can be generated for the entire system. For example, a system can be determined to be NIST 800-53 compliant if all relevant controls of the regulation are completed. A control implementation in a lower layer can satisfy the requirement for all higher layers, however, a higher layer may not satisfy the requirement for lower levels. A system architecture threat model can be integrated into the prioritized task list for the software solution such that the task requirement can comprise information on how the task has been addressed and any locations in the system where the task may not apply or be fully addressed.

Figure 13:
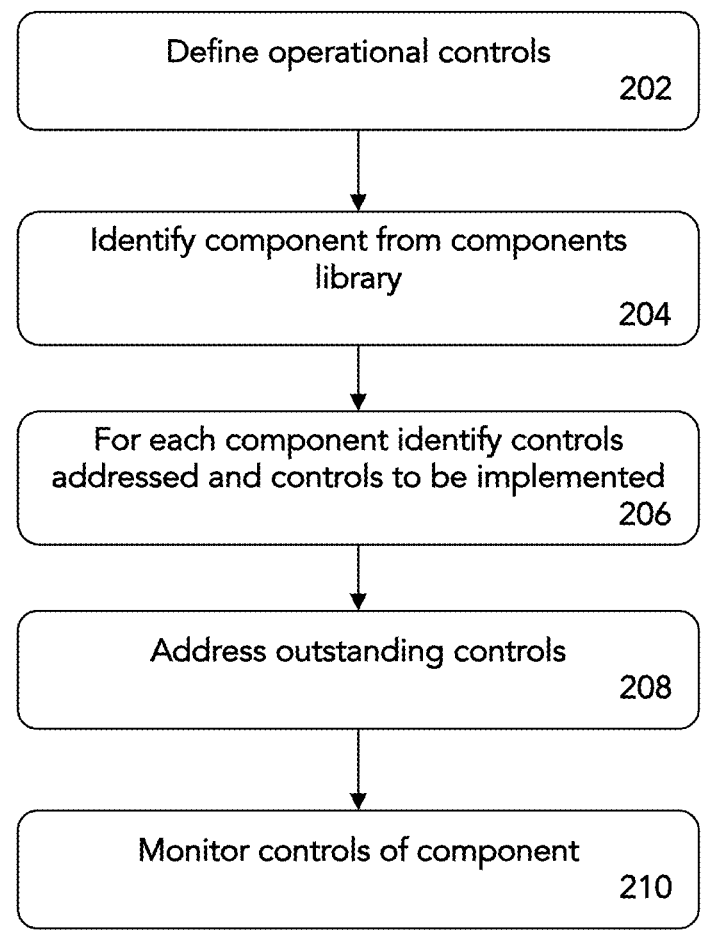
FIG. 13 is a method of component integration for a software solution in a production environment.

FIG. 13 is an example method of component integration for a software solution in a production environment. Operational controls for a component are defined 202 in the system to serve the purpose required by the software solution. The operational controls can comprise one or more task requirements required for satisfying functional requirements, non-functional requirements, or security requirements for development or maintenance of the software asset. The controls or task requirements are selected from a library of task requirements for implementing the controls. One or more components from the components library can then be identified 204 to address the operational controls required by the software solution. For each component identified, the component brings forward controls in the form of task requirements that are addressed by integration of the component and controls that are required to be implemented 206 to securely integrate the component into the software solution. Any outstanding controls to be implemented are then addressed 208 by the development team, and future monitoring of controls of the component 210 is put into place to ensure ongoing security of the software solution.

Figure 14:
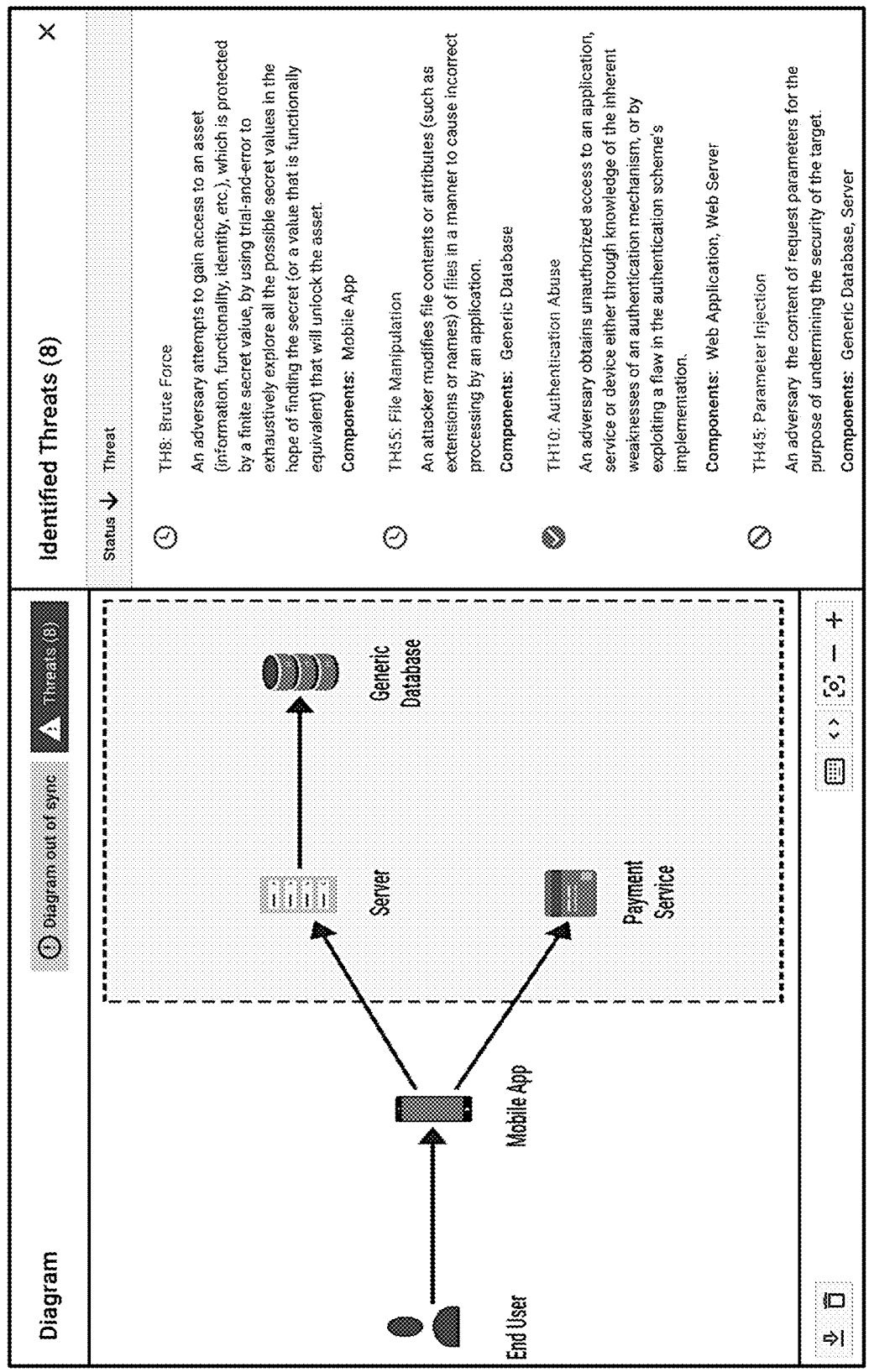
FIG. 14 is an example graphical user interface having a diagrammatic representation of a software system in a threat model.

FIG. 14 is an example graphical user interface having a diagrammatic representation of a software system in a threat model. The diagram shows a diagrammatic threat tree or system model of the software asset comprising components in the software asset and their connections, alongside a list of identified threats. The threats identified as part of the threat model can relate to, for example, components used where the controls have not been adequately addressed, and functional requirements that have not been adequately controlled. A threat or vulnerability exists when a control is insufficiently addressed and identifying the threat using the present system enables developers to be made aware of existing threats and find suitable solutions. In the threat tree shown there are four identified threats, three of which are outstanding and require attention (TH8, TH55, and TH45), and one threat that existed but has been adequately addressed (TH10). An audit trail of each threat can show who has worked on each identified threat and what was done to resolve it. Each threat shown is also tagged to its associated components that are related to the threat, either because the component introduced the threat, resolved the threat, or that the threat could be resolved by introduction of one or more component. Digging deeper into the entry for each threat together with its associated task requirements will provide additional information on how to resolve the threat.

In another implementation example, consider a system that provides payment processing to end users. The payment processing functionality needed by this system can be described by a set of tasks T1, T2, ... Tn, where each Ti ($1<=i<=n$) defines the required functionality (user, system, security, etc.). Instead of implementing these tasks from scratch, a team can select a component from a library of components that addresses these Ti requirements. In this example, the "Payment Service" component implements these tasks. Associated with this "Payment Service" component are tasks that must be implemented. These can include, for example, tasks that govern the activation and maintenance of this payment component, as well as tasks that are required to mitigate any security threats introduced by the component. At least one task is required in order to mitigate or control the risk involved with the use of the component. The risk associated with these such tasks are identified as threats, as shown.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A method for automated management of security controls for a software asset, the method comprising:
    storing a plurality of task requirements for the software asset in a database, the task requirements directed to implementation of a task requirement of the software asset and selected from a task requirements library;
    ordering the set of task requirements in a prioritized task list, each task requirement comprising actionable guidance for development of the software asset;
    selecting at least one shared component from a components library, the at least one shared component addressing at least one task requirement in the set of task requirements and comprising controls addressed by the shared component and controls required to be addressed for use of the shared component, wherein selecting the at least one shared component is based on minimization of number of task requirements in the prioritized task list;
    automatically updating the prioritized task list based on the selection of the at least one shared component by removing task requirements from the prioritized task list for controls addressed by the shared component and adding task requirements to the prioritized task list for controls required to be addressed for use of the shared component; and
    displaying the prioritized task list in a graphical user interface.

2. The method of claim 1, wherein the task requirements comprise functional requirements, non-functional requirements, and security requirements for development or maintenance of the software asset.

3. The method of claim 1, further comprising selecting the at least one shared component based on the task requirements addressed by the shared component in the prioritized task list.

4. The method of claim 1, wherein selecting the at least one shared component is done automatically based on the task requirements in the prioritized task list.

5. The method of claim 1, further comprising providing a plurality of possible component configurations for shared component selection.

6. The method of claim 1, further comprising automatically generating a threat modeling diagram indicating use of the at least one shared component in the software asset.

7. The method of claim 1, further comprising updating the prioritized task list throughout the software lifecycle when updates are made to the at least one selected shared component.

8. The method of claim 1, further comprising updating a shared component in the component library to effect an update to all software assets that utilize the shared component.

9. The method of claim 1, wherein the shared component comprises metadata pertaining to one or more of component tracking, versioning, and end of life information.

10. The method of claim 1, wherein the prioritized task list is generated for each software asset in an organization throughout the software asset development lifecycle.

11. The method of claim 1, further comprising hardening the one or more shared component.

12. The method of claim 1, further comprising containerizing the shared component.

13. A service-oriented architecture system for automated management of security requirements and software supply chain comprising:
    at least one processor coupled to a memory, the memory comprising:
        a requirements library comprising a plurality of task requirements accessible with a retrieval tool, each task requirement comprising task guidelines and actionable guidance to orchestrate software development of a software asset;
        a components library comprising a plurality of shared components, each shared component providing a functionality and comprising a set of controls, the set of controls comprising task requirements addressed by the shared component and task requirements required to be addressed for use of the shared component; and
        a prioritized task list for the software asset, the prioritized list comprising task requirements selected from the requirements library based on shared components in the components library utilized by the software asset, the prioritized task list adjusted based on the set of controls for the shared component, wherein use of shared components in the components library utilized by the software asset minimizes the number of task requirements in the prioritized task list; and a graphical user interface for displaying the prioritized task list.

14. The system of claim 13, wherein at least some of the plurality of shared components are pre-authorized, hardened, or containerized.

15. The system of claim 13, wherein the components library is distributed across one or more layers in a layered architecture.

16. The system of claim 13, wherein utilizing the shared component in the software asset removes task requirements from the prioritized task list.

17. The system of claim 13, wherein the system models use of different shared components to evaluate a change in risk profile or work required for the software asset in use of the different shared components.

18. The system of claim 13, wherein the system automatically generates a threat modeling diagram comprising the connection of selected shared components.

19. The system of claim 13, further comprising an application library comprising a plurality of applications that utilize the shared components in the components library.

* * * * *